(12) United States Patent
Sakai et al.

(10) Patent No.: US 8,186,648 B2
(45) Date of Patent: May 29, 2012

(54) METHOD OF SHUTTING OFF CONDUIT AND PIPE CONDUIT SHUTOFF APPARATUS

(75) Inventors: Atsushi Sakai, Sasayama (JP); Akihito Totsugi, Sanda (JP)

(73) Assignee: Waterworks Technology Development Organization Co., Ltd., Osaka (JP)

( * ) Notice: Subject to any disclaimer, the term of this patent is extended or adjusted under 35 U.S.C. 154(b) by 945 days.

(21) Appl. No.: 12/197,478

(22) Filed: Aug. 25, 2008

(65) Prior Publication Data

US 2009/0166573 A1 Jul. 2, 2009

(30) Foreign Application Priority Data

Dec. 28, 2007 (JP) ................................. 2007-339604

(51) Int. Cl.
*F16L 29/00* (2006.01)
(52) U.S. Cl. ........................... 251/148; 251/326; 137/13
(58) Field of Classification Search .................. 251/148, 251/248, 326–329; 137/13
See application file for complete search history.

(56) References Cited

U.S. PATENT DOCUMENTS

| | | | | |
|---|---|---|---|---|
| 3,316,929 A | * | 5/1967 | Milette | 251/148 |
| 4,194,721 A | * | 3/1980 | Nachtigahl | 251/326 |
| 5,056,755 A | * | 10/1991 | Jang et al. | 251/148 |
| 5,855,357 A | * | 1/1999 | Gunder | 251/326 |

FOREIGN PATENT DOCUMENTS

| | | |
|---|---|---|
| JP | 62-12090 | 1/1987 |
| JP | 2006-144824 | 8/2006 |
| JP | 2006349004 A | 12/2006 |

* cited by examiner

*Primary Examiner* — Steven J Ganey
(74) *Attorney, Agent, or Firm* — The Webb Law Firm

(57) ABSTRACT

To enable efficient and easy attachment of a shutoff operation cover at a proper attaching position relative to two joining flange portions and also to restrict deformation in a leading end portion of a gate plate valve. A shutoff operation cover B is attached to two pipe portions 2, 3 jointed and fastened together with a fastener 5. The shutoff operation cover B is capable of surrounding outer peripheries of the two joining flange portions 2A, 3A under a sealed condition, and there is provided a gate plate valve 10 in the form of a thin plate, the valve being insertable and withdrawable for shutting off conduits of the two pipe portions 2, 3. As the gate plate valve 10 is inserted to a conduit shutting position through a gap S formed between the two joining flange portions 2A, 3A in association with a loosening operation of the fastener 5, the conduit is shut off between the two joining flange portions 2A, 3A. When the shutoff operation cover B is attached to the two pipe portions 2, 3, a leading end 10b of the gate plate valve 10 located at a conduit opening position is advanced into an annular gap 26 formed on the outer peripheral sides of opposing faces of the two joining flange portions 2A, 3A.

4 Claims, 15 Drawing Sheets

METHOD OF SHUTTING OFF CONDUIT AND PIPE CONDUIT SHUTOFF APPARATUS

BACKGROUND OF THE INVENTION

1. Field of the Invention

The present invention relates to improvement of a method of shutting off a conduit at joining flange portions of two pipes fastened and joined with each other with a fastener such as bolts, included in components together constituting a fluid piping system such as a waterworks piping system, for the purpose of e.g. replacement of a repair valve, a fire hydrant, an air valve, or the like which is disposed downstream of the joining flange portions. The invention relates also to improvement of a pipe conduit shutoff apparatus used in such method.

2. Description of the Related Art

A conventional pipe conduit shutoff apparatus includes a shutoff operation cover of a split construction attachable to the respective two pipe portions fastened and joined to each other by means of a fastener in such a manner as to seal the outer peripheries of the two joining flange portions, a gate plate valve in the form of a thin plate which can be inserted into a gap formed between the two joining flange portions in association with a loosening operation of the fastener to a position for shutting off the pipe conduit, and an operating means for switching over the gate plate valve, under the sealed condition, between a conduit shutting position and a conduit opening position.

The shutoff operation cover includes an annular elastic seal member to be pressed against the outer peripheral faces of the two joining flange portions, split fastener rings for fastening this annular elastic seal member from the radial outward direction, and a valve body accommodating case, wherein when the rear end of the gate plate valve comes into contact with the bottom inside the valve body accommodating case the leading end portion of the gate plate valve enters slightly an entrance side of a valve insertion hole defined in the annular elastic seal member or is located on the inner side of the valve body accommodating case than the entrance of the valve insertion hole (See Patent Documents 1, 2).

And, at the start of the attaching operation of the shutoff operation cover to the two pipe portions, to the annular elastic seal member in pressed contact with the outer peripheral faces of the two joining flange portions, the fastener rings are fitted and fastened thereon, with the rear end of the gate plate valve being placed in contact with the bottom inside the valve body accommodating case. After the outer peripheries of the two joining flange portions are surrounded with allowing a loosening operation of the fasteners, the gate plate valve is inserted through the valve insertion hole defined in the annular elastic seal member and the gap formed between the two joining flange portions in association with the loosening operation of the fastener up to a conduit shutting position, thereby to shut off the conduit between the two joining flange portions.

Patent Document 1: Japanese Patent Application "Kokai" No. 2006-144824

Patent Document 2: Japanese Utility Model Application "Kokai" No. 62-12090

With this type of pipe conduit shutoff apparatus, in association with a relative separating displacement of the two joining flange portions in response to a loosening operation of the fastener, relative movement along the pipe axis direction is allowed between the outer peripheral faces of the two joining flange portions and the annular elastic seal member of the shutoff operation cover. Therefore, when the shutoff operation cover is attached to the joining flange portions of the two pipe portions, there is the risk of the setting being made improperly, with the leading end portion of the gate plate valve of the shutoff operation cover being offset to one lateral side of the pipe axis direction from the annular gap formed on the outer peripheral sides of the opposing faces of the two joining flange portions.

However, even if the setting was done improperly with such offset as described above, this is hardly recognizable from the outside. Therefore, the gate plate valve placed under the conduit opening position tends to be moved to the conduit shutting position, with such improper attached condition uncorrected. As a result, the sharp leading end portion of the gate plate valve can hit the outer peripheral face of the joining flange portion, thereby deforming this portion.

The present invention has been made in view of the above-described state of the art and its principal object is to provide a method of shutting off a conduit and a pipe conduit shutoff apparatus capable of allowing efficient and easy attachment of the shutoff operation cover to the two joining flange portions at its proper attaching position and capable of restricting deformation of the leading end portion of the gate plate valve, through rational improvement utilizing the annular gap formed on the outer peripheral sides of the opposing faces of the two joining flange portions.

SUMMARY OF THE INVENTION

A method of shutting off a conduit in a fluid piping system, relating to the present invention, comprises the steps of:

attaching a shutoff operation cover to two pipe portions fastened and joined together with a fastener, said shutoff cover being capable of sealingly surrounding outer peripheries of the respective joining flange portions, with allowing a loosening operation of the fastener, said shutoff operation cover including a gate plate valve capable of shutting off conduits of the two pipe portions, the gate plate valve being provided in the form of a thin plate and insertable and withdrawable; and inserting the gate plate valve of the shut-off operation cover to a conduit shutting position through a gap formed between the two joining flange portions in association with the loosening operation of the fastener, thereby shutting off the conduit between the two joining flange portions;

wherein when the shutoff operation cover is attached to the two pipe portions, the leading end portion of the gate plate valve at its conduit opening position is positioned into an annular gap formed on the outer peripheral side of opposing faces of the two joining flange portions.

With the above-described characterizing construction, when attaching the shutoff operation cover to joining flange portions of the two pipe portions, before the shutoff operation cover comes into contact with the outer peripheral faces of the joining flange portions, the leading end portion of the gate plate valve of this shutoff operation cover can be located into the annular gap formed on the outer peripheral sides of the opposing faces of the two joining flange portions. Therefore, the position displacement of the shutoff operation cover relative to the two joining flange portions can be restricted within the movable range of the leading end portion of the gate plate valve inside the annular gap.

As a result, the shutoff operation cover can be attached in an efficient and easy manner to the proper attaching position relative to the two joining flange portions. Further, the gate plate valve having its leading end inserted already into the annular gap is inserted in the next step, this inserting operation can proceed smoothly. In addition, deformation of the leading end portion of the gate plate valve and damage of the seal member can be restricted.

Moreover, contact between the leading end portion of the gate plate valve which has been inserted into the annular gap between the opposing faces of the two joining flange portions and the opposing faces of the two joining flange portions is felt by the operator through its operational resistance, it is easy for the operator to recognize sensuously the predetermined attaching position of the shutoff operation cover. This is another advantage.

According to a further characterizing construction of the present invention, when the attaching operation of the shutoff operation cover to the two pipe portions is to be started, the leading end portion of the gate plate valve protrudes closer to a conduit shutting position than a predetermined insertion position within the annular gap between the two joining flange portions; and according as the leading end comes into contact with a portion of the pipe portion in the course of its movement into the annular gap, the leading end portion of the gate plate valve is retracted toward the predetermined insertion position.

With the above-described characterizing construction, as the leading end portion side of the gate plate valve projects largely toward the conduit shutting position relative to this contact portion, the engagement of the leading end portion of the gate plate valve into the annular gap between the opposing faces of the two joining flange portions can proceed easily. Further, at the leading end portion deeply inserted in advance, the border position of the two joining flange portions can be easily sensed. Moreover, as the excess projecting size of the leading end portion of the gate plate valve is retracted toward the predetermined insertion position in accordance with the contact, the attaching position of the shutoff operation cover relative to the two joining flange portions can be set properly, efficiently and easily.

According to a further characterizing construction of the present invention, when the shutoff operation cover is attached to the two pipe portions, the leading end portion of the gate plate valve located at its conduit opening position comes into contact with an outer peripheral portion of a downstream sealing face of the seal member bound between the opposing faces of the two joining flange portions.

With the above-described characterizing construction, when the shutoff operation cover is attached to the joining flange portions of the two pipe portions, before this shutoff operation cover comes into contact with the outer peripheral faces of the two joining flange portions, the leading end portion of the gate plate valve of this shutoff operation cover advances into the annular gap formed on the outer peripheral side between the opposing faces of the two joining flange portions, and at the same time the leading end portion of the gate plate valve comes into contact with the outer peripheral portion of the downstream sealing face of the seal member bound between the opposing faces of the two joining flange portions. Therefor, it is possible to improve the precision in the attaching position of the shutoff operation cover relative to the two joining flange portions. It becomes also possible to restrict damage to the seal member which tends to occur in the course of the inserting operation of the gate plate valve of the shutoff operation cover through the gap formed between the two joining flange portions as a result of the loosening operation of the fastener.

According to a still further characterizing construction of the present invention, the method further comprises the steps of:

removing from among a plurality of sets of bolts/nuts that constitutes the fastener, a bolt and a nut present within a movement path of the gate plate valve from the bolt insertion holes of the two joining flange portions;

providing a sealing frame having an approximately angular hook shape, including a seal member for sealing the vacant bolt insertion holes of the two joining flange portions from an opening side and pressing means for pressing and moving the seal member toward the opening side of the bolt insertion holes, and fitting said sealing frame to the two joining flange portions from their outsides; and sealing the bolt insertion holes of the two joining flange portions from their opening sides by pressing and moving the seal member using said pressing means.

As the result of removing of the bolt/nut of the fastener which are present in the movement path of the gate plate valve, there arises the necessity of a sealing operation of the bolt insertion holes of the two joining flange portions. With the above-described characterizing construction, by the seal member and the pressing means included in the angular hooked shaped sealing frame which can be fitted on the two joining flange portions, the bolt insertion holes of the two joining flange portions are sealed from their opening sides. Therefore, in comparison with a case where the seal member and the pressing means are assembled to the two pipe portions, the above construction can be less influenced by the shapes of the two pipe portions. Further, in comparison with attachment to the bolt insertion holes of the two joining flange portions, the above attaching operation can be less troublesome.

According to a still further characterizing construction of the present invention, the method further comprises the steps of:

removing from among a plurality of sets of bolts/nuts that constitutes the fastener, a bolt and a nut present within a movement path of the gate plate valve from the bolt insertion holes of the two joining flange portions;

providing a seal member for sealing the vacant bolt insertion holes of the two joining flange portions from an opening side, and pressing means for pressing and moving the seal member toward the opening side of the bolt insertion holes, and assembling said seal member and said pressing means to the two pipe portions; and sealing the bolt insertion holes of the two joining flange portions from their opening sides by pressing and moving the seal member using said pressing means.

With the above-described characterizing construction, as the seal member and the pressing means are assembled with the two pipe portions which are moved relative to and away from each other in association with a loosening operation of the fastener, the desired sealing condition by the seal member and the pressing means can be maintained, regardless of the loosening operation of the fastener.

According to a further aspect of the present invention, there is provided a pipe conduit shutoff apparatus, the apparatus comprising:

a shutoff operation cover having a split construction, the cover being attachable to two pipe portions jointed and fastened to each other with a fastener so as to seal outer peripheries of two joining flange portions of the two pipe portions;

said shutoff operation cover including:

a gate plate valve in the form of a thin plate which can be inserted into a gap formed between the two joining flange portions in association with a loosening operation of the fastener, to a position for shutting off the pipe conduit, and an operating means for switching over the gate plate valve, under the sealed condition, between a conduit shutting position and a conduit opening position;

wherein when the shutoff operation cover is attached to the two pipe portions, the leading end portion of the gate plate valve at its conduit opening position is positioned into an annular gap formed on the outer peripheral side of opposing faces of the two joining flange portions.

With the above-described characterizing construction, when the shutoff operation cover is to be attached to the joining flange portions of the two pipe portions, before the shutoff operation cover comes into contact with the outer peripheral faces of the joining flange portions, the leading end portion of the gate plate valve of the shutoff operation cover can be located into the annular gap formed on the outer peripheral sides of the opposing faces of the two joining flange portions. Therefore, the position displacement of the shutoff operation cover relative to the two joining flange portions can be restricted within the movable range of the leading end portion of the gate plate valve inside the annular gap.

As a result, the shutoff operation cover can be attached in an efficient and easy manner to the proper attaching position relative to the two joining flange portions. Further, the gate plate valve having its leading end inserted already into the annular gap is inserted in the next step, this inserting operation can proceed smoothly. In addition, deformation of the leading end portion of the gate plate valve and damage of the seal member can be restricted.

Moreover, contact between the leading end portion of the gate plate valve which has been inserted into the annular gap between the opposing faces of the two joining flange portions and the opposing faces of the two joining flange portions is felt by the operator through its operational resistance, it is easy for the operator to recognize sensuously the predetermined attaching position of the shutoff operation cover. This is another advantage.

According to a further characterizing construction of the present invention, said shutoff operation cover further includes an engaging retaining means for engaging and retaining an operational member of the operating means at its conduit shutting position.

With the above characterizing construction, when the gate plate valve has been switched over to the conduit shutting position through the gap formed between the two joining flange portions in association with the loosening operation of the fastener, this is engaged and retained by the engaging retaining means, the operational member of the operating means can be engaged and retained by the engaging retaining means provided in the shutoff operation cover, so that the gate plate valve which has been switched over to the conduit shutting position can be prevented reliably from being moved to the conduit opening position side due to the pressure of fluid flowing from the gap.

According to a still further characterizing construction of the present invention, the apparatus further comprises: forcible opening means provided between the shutoff operation cover and the operating means for forcibly moving the gate plate valve located at the conduit shutting position toward the conduit opening position.

With the above-described characterizing construction, when the gate plate valve located at the conduit shutting position is to be opened, even if it is difficult to move it due to e.g. fluid pressure, the gate plate valve can be forcibly moved toward the conduit opening position side in a reliable and easy manner, by the forcible opening means. As a result, the working efficiency at the operation site can be improved.

According to a still further characterizing construction of the present invention, said shutoff operation cover further includes popping movement restricting means for coming into contact with the operational member of the operating means when the operational member located at the conduit shutting position has been moved to an initial opening operation position offset toward the conduit opening position side, thereby to prevent this operational member from being moved toward the conduit opening position side.

When the retention is released by a loosening operation of the fastener, the fluid flowing out through the gap between the two joining flange portions may cause the gate plate valve located at the conduit shutting position to "pop out" toward the conduit opening position. This popping movement can be reliably prevented by the above-described characterizing construction, through the engagement between the popping movement restricting means and the operating means provided in the shutoff operation cover. Moreover, as this preventing or checking action can be provided at the initial opening operation position offset toward the conduit opening position side from the conduit shutting position, the impact applied to the popping movement restricting means can be small, so that this popping movement restricting means can be simplified.

According to a still further characterizing construction of the present invention, said shutoff operation cover includes an annular elastic seal member to be pressed against outer peripheral faces of the two joining flange portions, a pair of split fastener rings for fitting and fastening the annular elastic seal member from its radial outer side, and a valve body accommodating case provided in one split fastener ring for slidably accommodating the gate plate valve, wherein when a rear end portion of the gate plate valve comes into contact with a bottom inside the valve body accommodating case, a leading end portion of the gate plate valve projects at a position where the leading end portion can enter the annular gap between the two joining flange portions, relative to a contacting portion of the annular elastic seal member coming into contact with the outer peripheries of the two joining flange portions.

With the above-described characterizing construction, by simply placing the rear end portion of the gate plate valve in abutment with the bottom inside the valve body accommodating case, the leading end portion can obtain a predetermined projecting length relative to the contacting portion of the annular elastic seal member coming into contact with the outer peripheries of the two joining flange portions. As a result, it is possible to simply the operational procedure for attaching the shutoff operation cover to the joining flange portions of the two pipe portions.

According to a still further characterizing construction of the present invention, the apparatus further comprises a setting maintaining means for fixing or maintaining in position the gate plate valve when said gate plate valve is in the position where the leading end portion of the gate plate valve is located at the projecting position where it can enter the annular gap formed on the outer peripheral side between the opposing faces of the two joining flange portions, relative to a contacting portion of the annular elastic seal member coming into contact with the outer peripheries of the two joining flange portions.

With the above-described characterizing construction, the leading end portion of the gate plate valve can be fixed or maintained in position at a position where it projects more toward the conduit shutting position side, than the contacting portion of the annular elastic seal member coming into contact with the outer peripheries of the two joining flange portions. Therefore, when the shutoff operation cover is to be attached to the joining flange portions of the two pipe portions, even if the leading end portion of the gate plate valve of this shutoff operation cover comes into contact with another constitutional element before the shutoff operation cover comes into contact with the outer peripheries of the two joining flange portions, this leading end portion of the gate plate valve can reliably enter the annular gap formed on the outer peripheral side between the opposing faces of the two joining flange portions, so that the positional displacement of the shutoff operation cover relative to the two joining flange portions can be restricted within the movable range of the leading end portion of the gate plate valve inside the annular gap.

Moreover, due to the reliable contact between the leading end portion of the gate plate valve which enters in advance the annular gap between the opposing faces of the two joining flange portions, and the opposing faces of the two joining flange portions, the operator can readily recognize sensuously the predetermined attaching position of the shutoff operation cover.

DESCRIPTION OF THE PREFERRED EMBODIMENTS

First Embodiment

Figure 1:
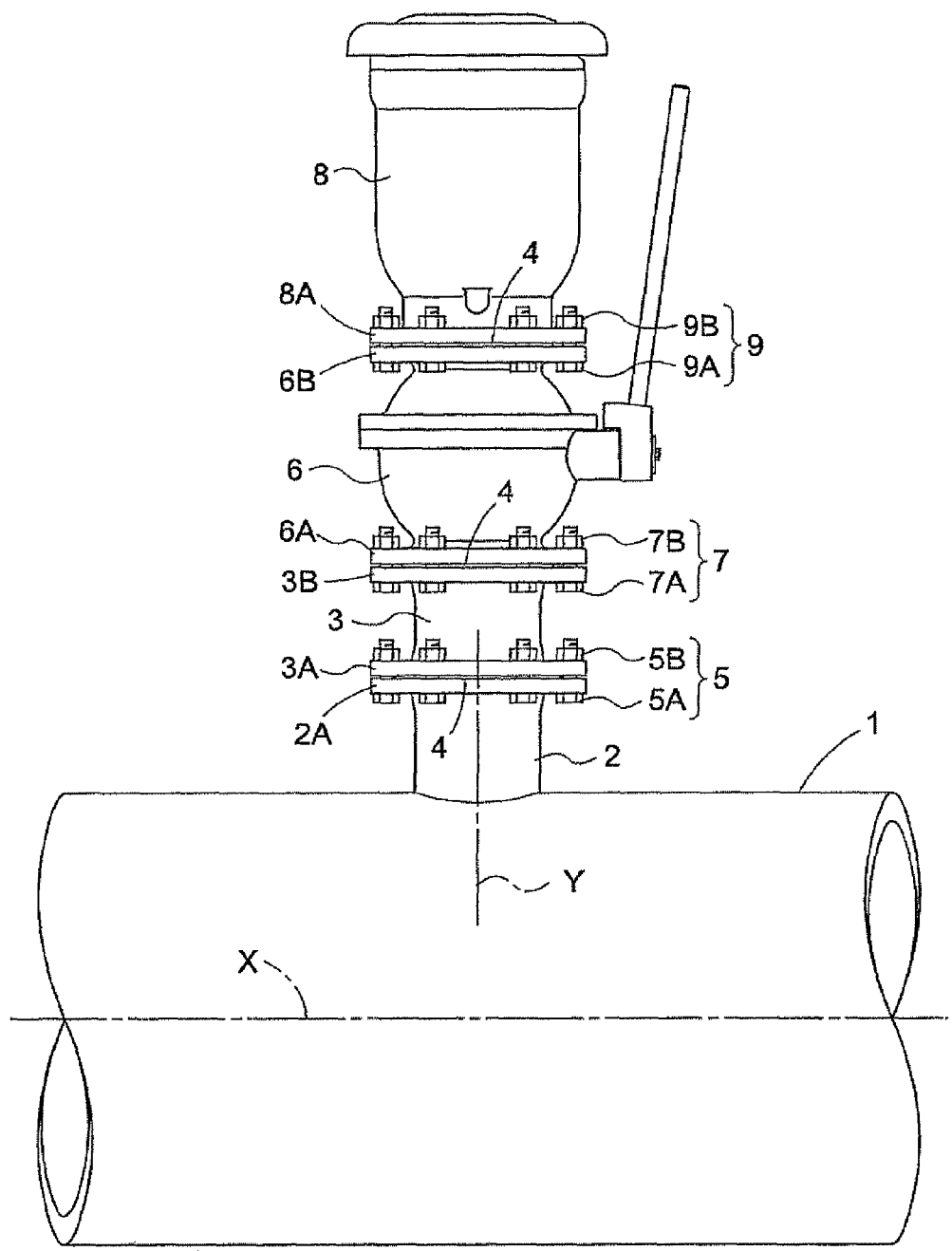
FIG. 1 is a side view of a pipe joining construction in a fluid piping system showing a first embodiment of the present invention.
Figure 2:
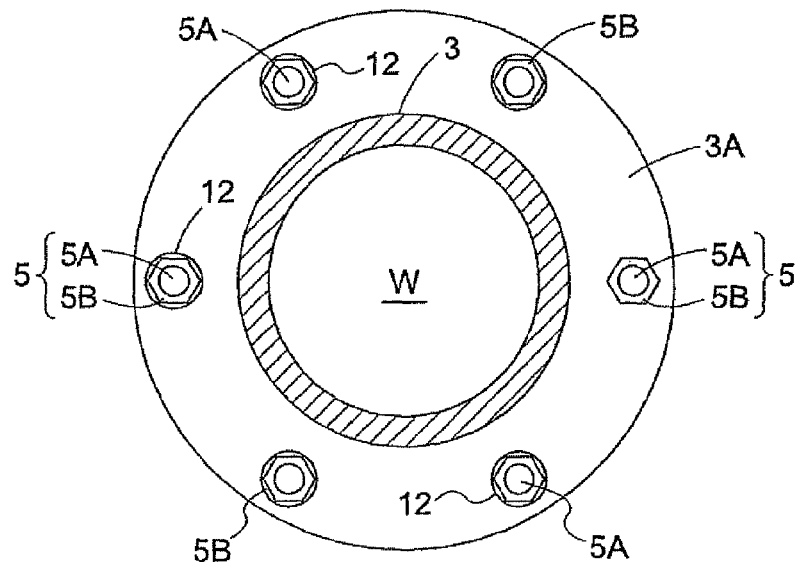
FIG. 2 is a plan view in section showing principal portions when fasteners have been replaced by waterproof type.
Figure 3:
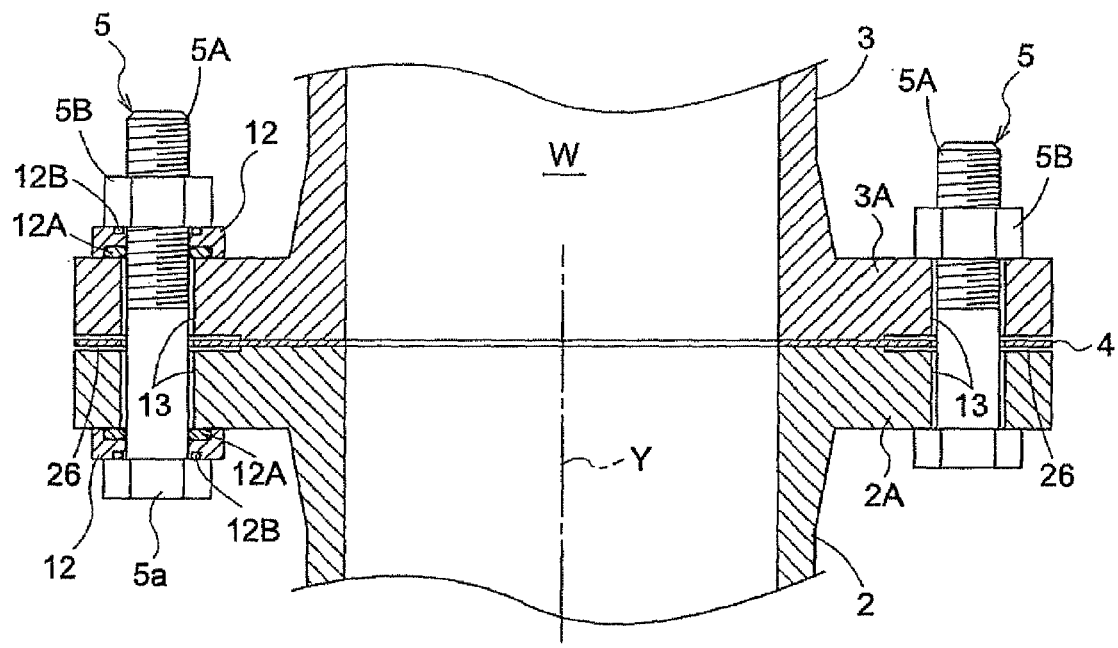
FIG. 3 is a side view in section showing principal portions when the fasteners have been replaced by the waterproof type.

FIGS. 1-3 show a pipe joining construction included in a fluid piping system. In this, in midway of a waterworks pipe 1 made of a cast iron pipe as one example of a fluid pipe, there is formed, as an integral projection, a branch pipe portion 2 as an upstream pipe portion.

The branch pipe portion 2 includes a joining flange portion 2A, to which there is detachably connected an upstream side joining flange portion 3A of a joint pipe 3 as a downstream pipe portion. The upstream joining flange portion 3A is fastened and joined under a sealed condition with the joining flange portion 2A, with a sheet packing 4, as an example of a seal member, being interposed between joining faces of the upstream joining flange portion 3A and the joining flange portion 2A, by means of a first fastener 5 consisting of a plurality of sets of bolts 5A and nuts 5B.

Simultaneously, the joint pipe 3 includes a downstream joining flange portion 3B, to which there is detachably fastened and connected an upstream joining flange portion 6A of a repair valve 6 as an example of a fluid device or a piping member. The upstream joining flange portion 6A is also fastened and joined under a sealed condition with the downstream joining flange portion 3B, with a sheet packing 4, as an example of a seal member, being interposed between joining faces of the upstream joining flange portion 6A and the downstream joining flange portion 3B, by means of a second fastener 7 consisting of a plurality of sets of bolts 7A and nuts 7B.

Similarly, to the downstream joining flange portion 6B of the repair valve 6, there is detachably joined under a sealed condition an upstream joining flange portion 8A of an air valve 8 as an example of a fluid device or a piping member, with a sheet packing 4 as an example of seal member being interposed between their joining faces, by means of a third fastener 9 consisting of a plurality of sets of bolts 9A and nuts 9B.

Figure 4:
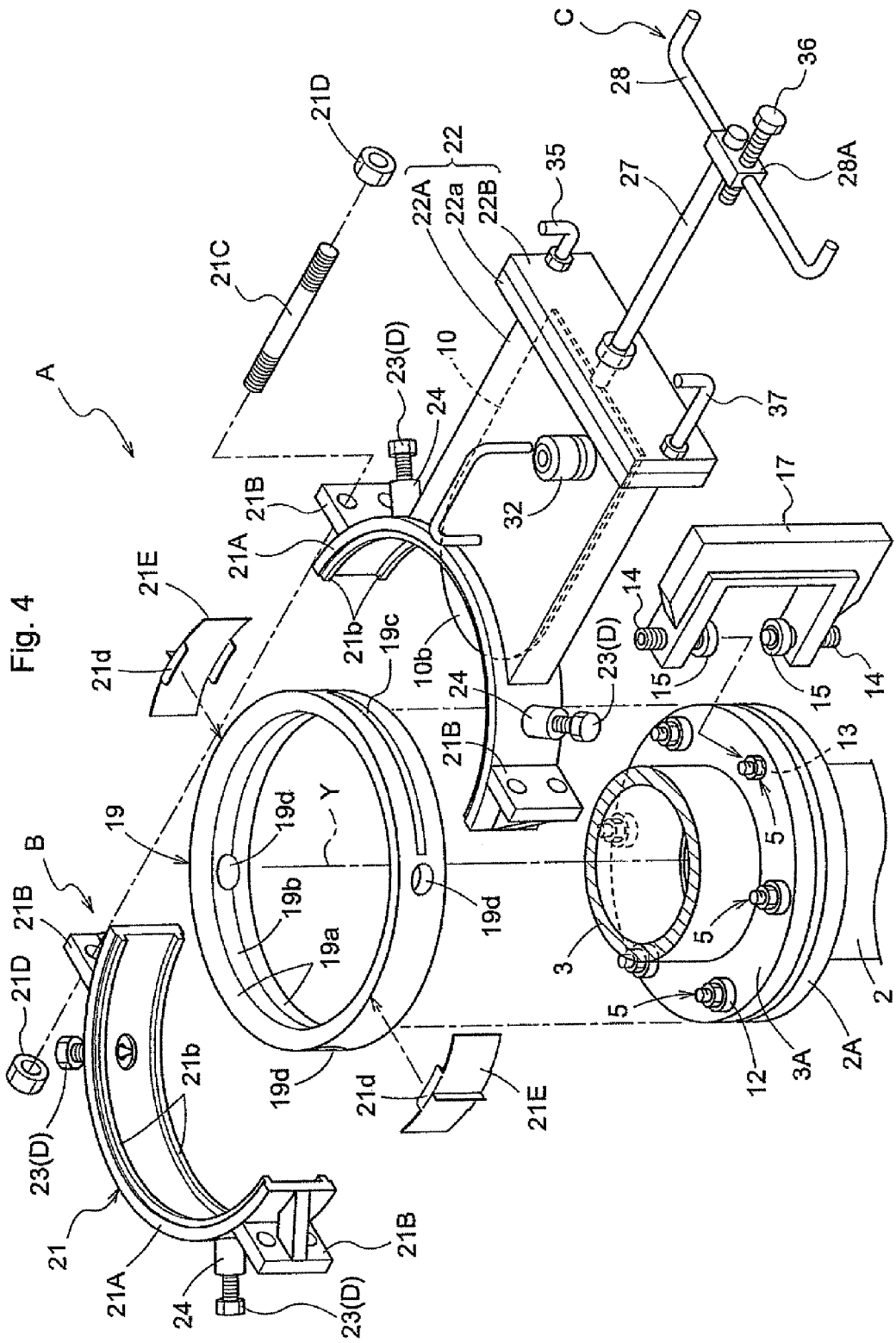
FIG. 4 is an exploded perspective view of a pipe conduit shutoff apparatus.

As shown in FIG. 4, between and across the branch pipe portion 2 and the joint pipe 3, there is provided a pipe conduit shutoff apparatus A. The pipe conduit shutoff apparatus A is capable of shutting off a pipe conduit W extending along a branch axis Y normal to a pipe axis X of the waterworks pipe 1, between the joining flange portion 2A of the branch pipe portion 2 and the upstream joining flange portion 3A of the joint pipe 3. Namely, when there has arisen a need of replacing the repair pipe 6 for a certain reason, e.g. water leak, operational failure, due to deterioration, with use of the pipe conduit shutoff apparatus A, it is possible to shut off the pipe conduit W, under a non-water-stopped condition with maintaining continuous water supply inside the waterworks pipe 1.

As shown in FIGS. 4-18, the pipe conduit shutoff apparatus A includes, as its principal components, a shutoff operation cover B detachably attached to the branch pipe portion 2 and the joint pipe 3 in such a manner to seal outer peripheries of the two joining flange portions 2A, 3A thereof, a gate plate valve 10 in the form of a thin plate movable to be inserted through a gap S (see FIG. 12) between joining faces of the two joining flange portions 2A, 3A formed in response to loosening operations of the bolts 5A and nuts 5B of the first fastener 5, to a position for shutting off the pipe conduit W, and an operating means C for switching over the gate plate valve 10 under the sealed condition between a conduit shutting position and a conduit opening position. At a plurality of positions in the shutoff operation cover B along its peripheral direction (at four peripheral positions in the instant embodiment, there are provided gap forming means D for spreading apart the joining faces of the two joining flange portions 2A, 3A from each other within the loosening margin of the bolts 5A, the nuts 5B of the first fastener 5.

The first fastener 5 needs to be modified from the normal type into a waterproof type having superior sealing function. For this reason, in the case of the instant embodiment, as shown in FIG. 3, sealing (water-stopping) washers 12 are interposed between the head 5a of the bolt 5A and the joining flange portion 2A of the branch pipe portion 2 and also between the nut 5B and the upstream joining flange portion 3A of the joint pipe 3. Accordingly, a bolt 5A will also be replaced by a waterproof type bolt which is longer than the standard one by a length corresponding to two sealing washers 12.

Within an annular recess defined in one of two contacting faces of the sealing washer 12, there is attached a first seal member 12A for sealing (water-tightening) between the outer face of the joining flange portion 2A or 3A and the outer peripheral face of the bolt 5A. Within another annular recess defined in the other contact face, there is fitted a first seal member 12B for sealing (water-tightening) between the head 5a of the bolt 5A and the nut 5B.

Figure 10:
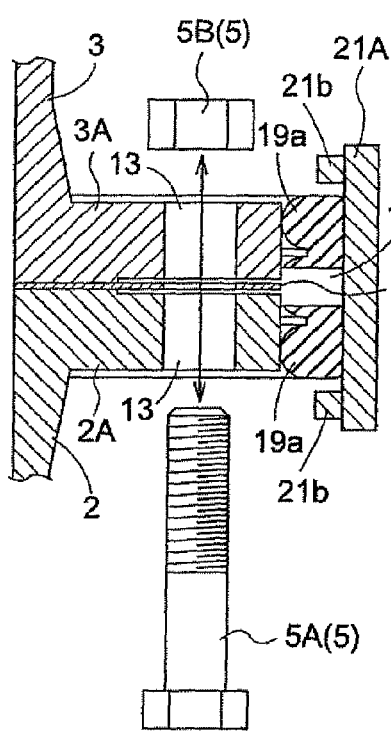
Figure 10:
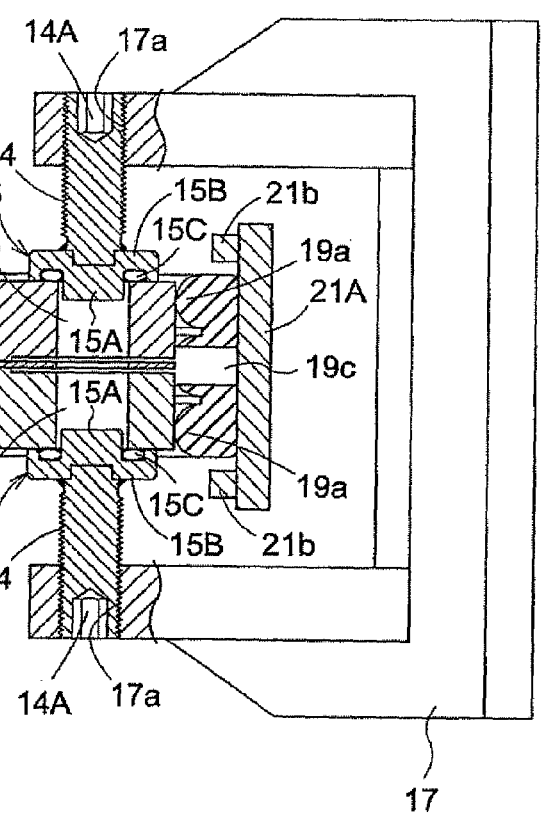

As illustrated in FIG. 10 (a), of the bolts 5A and nuts 5B of the first fastener 5, one set of bolt 5A and nut 5B present within a movement path of the gate plate valve 10 are removed through a bolt insertion hole 13 of the two joining flange portions 2A, 3A.

Next, as illustrated in FIG. 10 (b), a sealing (water-stopping) frame 17 having an approximately angular hooked shape is mounted to the two joining flange portions 2A, 3A from the outer side of the pipe radius direction. The sealing frame 17 includes a pair of seal members 15 for sealing the bolt insertion holes 13, from the opening sides thereof, of the two joining flange portions 2A, 3A after the removal, and a pressing means 14 for pressing and moving the seal members 15 toward the opening sides of the bolt insertion holes 13. Once the pressing means 14 is operated to move and press the pair of seal members 15 closer to each other, the respective seal members 15 seal the bolt insertion holes 13 of the two joining flange portions 2A, 3A from the opening sides thereof.

More particularly, at upper and lower end portions of the sealing frame 17, there are defined threaded holes 17a. In each threaded hole 17a, there is threaded a threaded shaft constituting the pressing means 14, with the thread shaft being axially movable along the direction of axis of the bolt insertion hole 13. The seal member 15 is affixed to one terminal end of the threaded shaft 14. The seal member 15 includes a shaft portion 15A engaged into the bolt insertion hole 13, a flange portion 15B for coming into contact with an outer peripheral face of an opening peripheral edge of the bolt insertion hole 13, and a seal member 15C for sealing (water-tightening) relative to the outer face of the joining flange portion 2A or 3A. At the other terminal end of the threaded shaft 14, there is defined an operational recess 14A for engagement with a tool such as a hexagonal wrench.

As shown in FIG. 4, the shutoff operation cover B consists essentially of an annular elastic seal member 19, a fastener ring 21 of a two-split ring construction for fastening and fixing this annular elastic seal member 19 from its radial outer direction, and a valve body accommodating case 22 provided in one split fastener ring 21.

Figure 6:
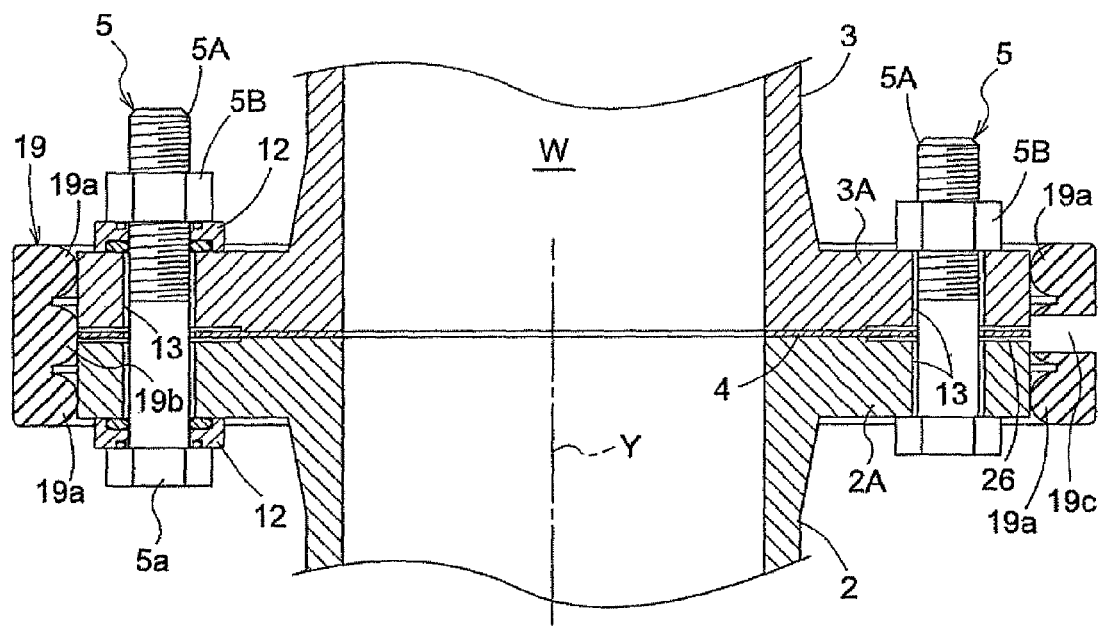
FIG. 6 is a side view in section showing principal portions when the annular elastic seal member is attached.

The annular elastic seal member 19 is an annular member comprised of an annular first sealing portion 19a and second sealing portion 19b formed integrally. As shown in FIG. 6, both the first sealing portion 19a and the second sealing portion 19b have an approximately semi-circular cross section.

Figure 12:
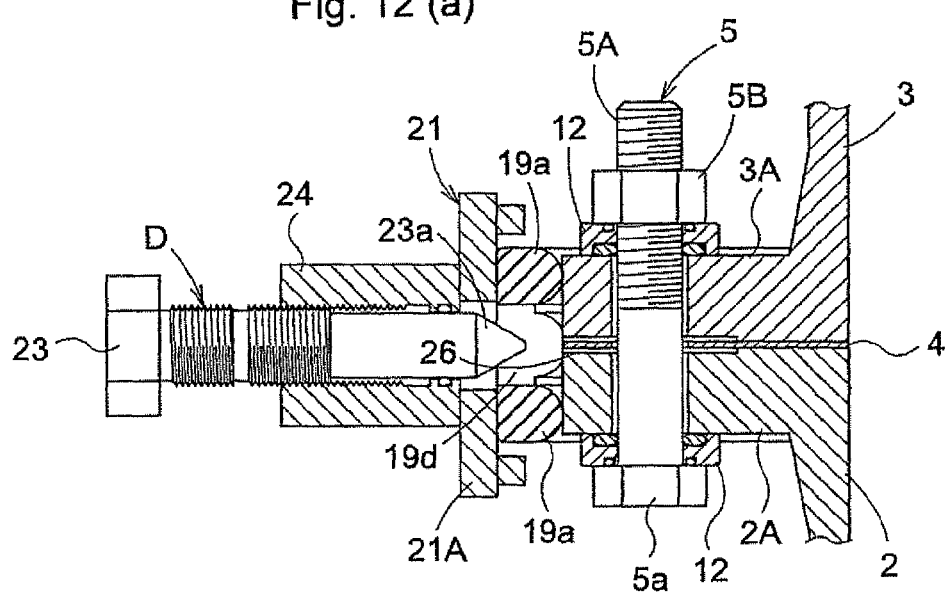
Figure 12:
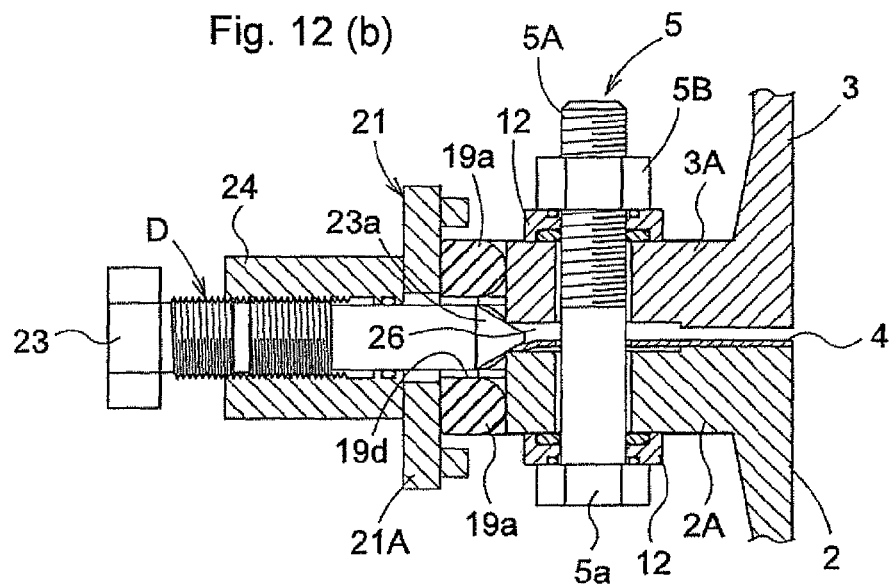

The first sealing portion 19a can be pressed, from the radially outer direction, against the outer peripheral faces of the respective joining flange portions 2A, 2B. On the other hand, as shown in FIG. 12, the second sealing portion 12b can be pressed from the radial outer direction, partially into an annular gap 26 formed on the outer peripheral sides of the two joining flange portions 2A, 3A. The valve body accommodating case 22 slidably accommodates therein the gate plate valve 10.

Figure 5:
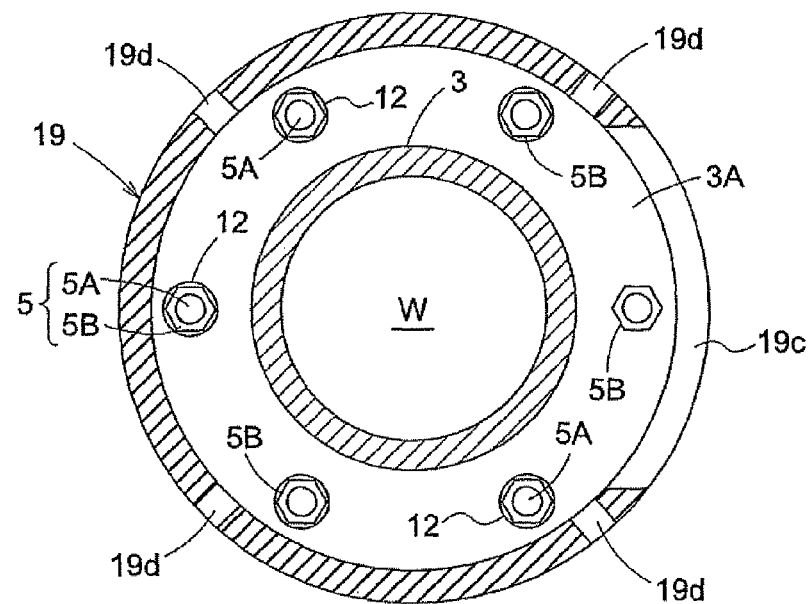
FIG. 5 is a plan view in section showing principal portions when an annular elastic seal member is attached.

As shown in FIGS. 4 through 6, the width of the annular elastic seal member 19 is set to be equal (or substantially equal) to the distance between the outer faces of the two joining flange portions 2A, 3A in the branch pipe axis direction Y, when the joining faces of the two joining flange portions 2A, 3A form therebetween a gap S (see FIG. 12) capable of allowing insertion of the gate plate valve 10. In the inner peripheral face of the annular elastic seal member 19, there are provided a second sealing portion 19b disposed at the width-wise center position corresponding to the center position of the two joining flange portions 2A, 3A and second sealing portions 19d disposed at the widthwise opposed ends corresponding to the respective outer peripheral faces of the two joining flange portions 2A, 3A. In the above, the radially inward projecting length of the second sealing portion 19b is set greater than the radially inward projecting length of the first sealing portion 19a. Incidentally, the minimum inside diameter of the two first sealing portions 19a and the minimum inside diameter of the second sealing portion 19b are set smaller than the outside diameter of the outer peripheral faces of the joining flange portions 2A, 3A.

As shown in FIG. 4 and FIG. 10, the second sealing portion 19b of the annular elastic seal member 19 defines an opening 19c allowing inserting movement of the gate plate valve 10. Also, as shown in FIG. 4 and FIG. 12, there is defined a through hole 19d for receiving, from the radially outer direction, the leading end portion of the separation bolt 23 constituting the gap forming means D.

As shown in FIGS. 4-9, the fastener ring 21 consists of a pair of approximately semi-circular fastener split rings 21 having a width greater than the width of the annular elastic seal member 19 in the branch pipe axis direction Y, a bolt 21C and a nut 21D for drawing two sets of joining pieces 21B affixed to the peripheral opposed ends of the respective fastener split rings 21A closer to each other and fixing these, and a pair of backing plates 21E. The backing plates 21E serve to prevent a portion of the annular elastic seal 19 from protruding radially outward from between the end faces of the two fastener split rings 21A, in association with a fastening operation of the bolt 21C and the nut 21D.

Once the bolt 21C and the nut 21D are fastened with a predetermined torque, the two first sealing portions 19a are pressed with a predetermined contact pressure against the outer peripheral faces of the two joining flange portions 2A, 3A to be sealed (water tightened) and the second sealing portion 19b is pressed and sealed (water tightened) with a predetermined pressure within the annular gap 26A formed on the outer peripheral side of the opposing faces of the two joining flange portions 2A, 3A. Under this condition, even if the branch pipe portion 2 and the joint pipe 3 are moved away from each other due to the water pressure, the effects of these sealing arrangements (water tightening) restrict free outflow of the fluid to the outside of the system.

Figure 11:
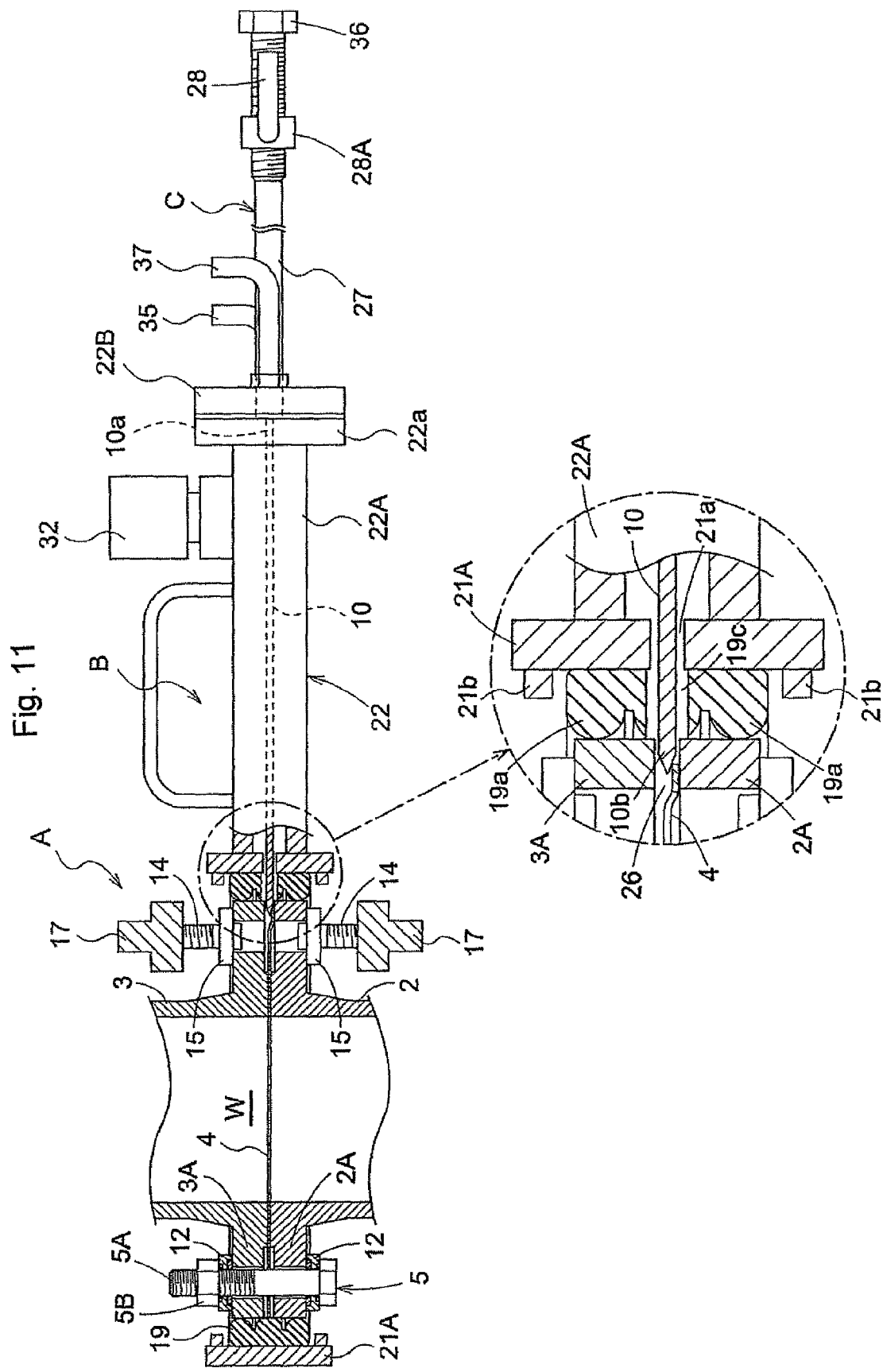
FIG. 11 is a partially cutaway side view of the whole apparatus upon completion of mounting of the pipe conduit shutoff apparatus, FIGS. 12 (a) and (b) are enlarged cross sectional side views illustrating a gap forming procedure by a gap forming means.

As shown in FIG. 11, in the fastener split rings 21A, at the peripheral center positions opposed in the radial direction to the opening 19c of the annular elastic seal member 19, there are formed slit-like openings 21a. The opening 21a has a similar shape to the cross sectional shape of the gate plate valve 10 and is slightly larger than the latter. The opening 21a has a function of slidably guiding the insertion/withdrawal of the gate plate valve 10.

Further, as shown in FIG. 4, on the outer peripheral faces of the two fastener split rings 21A, there are provided four threaded cylinders 24. In each threaded cylinder 24, the separation bolt 23 is threaded and retained from the radially outer side. The four threaded cylinders 24 are disposed at positions radially opposed to the respective through holes 19d of the annular elastic seal member 19.

At upper and lower opposed sides of the inner peripheral faces of the two fastener split rings 21A, there are formed stopper ridges 21b for stopping or preventing displacement of the annular elastic seal member 19 from the predetermined attaching position.

The vertical width of the backing plate 21E is designed to allow insertion of the plate from the end side between the two opposed stopper ridges 21b on the inner peripheral face of the fastener split ring 21A.

Further, in the backing plate 21E, there are formed, by bending of the plate, a pair of retaining pieces 21d engageable with the annular elastic seal member 19 from the radially outer side for preventing its vertical relative displacement.

As shown in FIG. 4, the valve body accommodating case 22 consists of an angular tubular lid body 22A affixed to the outer face of the fastener split ring 21A and a lid body 22B for sealing a joining flange portion 22a formed at the leading end portion of the lid body 22A. The lid body 2A is in communication with the slit-like opening 21a of the fastener split ring 21A. The lid body 22B supports an operational shaft 27 of the operating means C provided continuously with the gate plate valve 10 and extending through the body 22B, with the shaft 27 being manually operable along the moving direction of the gate plate valve 10. Further, the lid body 22A includes a connecting tool 32 connectable with a water feeding hose 31 of a pressurizing device E (see FIG. 16) having a hydraulic pump 30. The purpose of connecting the pressurizing device E is rendering the pressure inside the lid body 22A equal or substantially equal to the inner pressure of the joint pipe portion 2.

As shown in FIG. 11, the distance from the inner face of the lid body 22B forming the bottom of the valve body accommodating case 22 to the slit-like opening 21a of the fastener split ring 21A is set shorter than the overall length of the gate plate valve 10. Further, by pulling out maximally the operating means C, when a rear end portion 10a of the gate plate valve 10 is in contact with the inner face of the lid body 22B, a leading end portion 10b of the gate plate valve 10 is already at such a position where the end portion can enter the annular gap 26 on the outer peripheral side of the opposing faces of the two joining flange portions 2A, 3A.

In other words, the length of the gate plate valve 10 is set such that when the rear end portion 10a is in contact with the inner face of the lid body 22B, the leading end portion 10b of the gate plate valve 10 can enter the annular gap 26 between the opposing faces of the two joining flange portions 2A, 3A. At the same time, under this condition that the leading end portion 10b of the gate plate valve 10 can enter the annular gap 26 between the opposing faces of the two joining flange portions 2A, 3A, the leading end portion 10b comes into contact with the outer peripheral side portion of a downstream sealing face of the sheet packing 4 protruding into the annular gap 26 (see the enlarged figure in FIG. 11).

Further, as the leading end portion 10b of the gate plate valve 10 under the condition prior to its insertion to the conduit shutting position, projects farther toward the conduit shutting position than the contacting portion of the annular elastic seal member 19 of the shutoff operation cover B contacting the outer peripheries of the two joining flange portions 2A, 3A, when the shutoff operation cover B is to be attached to the joining flange portions 2A, 3A of the two pipe portions 2, 3, the leading end portion 11b of the gate plate valve 10 enters the annular gap 26 on the outer peripheral side between the opposing faces of the two joining flange portions 2A, 3A before this shutoff operation cover B comes into contact with the outer peripheral faces of the two joining flange portions 2A, 3A. Therefore, positional displacement of the shutoff operation cover B relative to the two joining flange portions 2A, 3A can be restricted within the movable range of the leading end portion 10b of the gate plate valve 10 inside the annular gap 26.

Further, as the leading end portion 10b of the gate plate valve 10 comes into contact with the outer peripheral portion of the downstream sealing face of the sheet packing 4 clamped between the opposing faces of the two joining flange portions 2A, 3A, there is obtained improvement in the precision in the attaching position of the shutoff operation cover B relative to the two joining flange portions 2A, 3A. Moreover, as the leading end portion 10b comes into contact with the packing 4, when the gate plate valve 10 is to be inserted, as a subsequent step, to the conduit shutting position through the gap S formed in association with a loosening operation of the fastener 5, damage to the sheet packing 4 will hardly occur.

Figure 7:
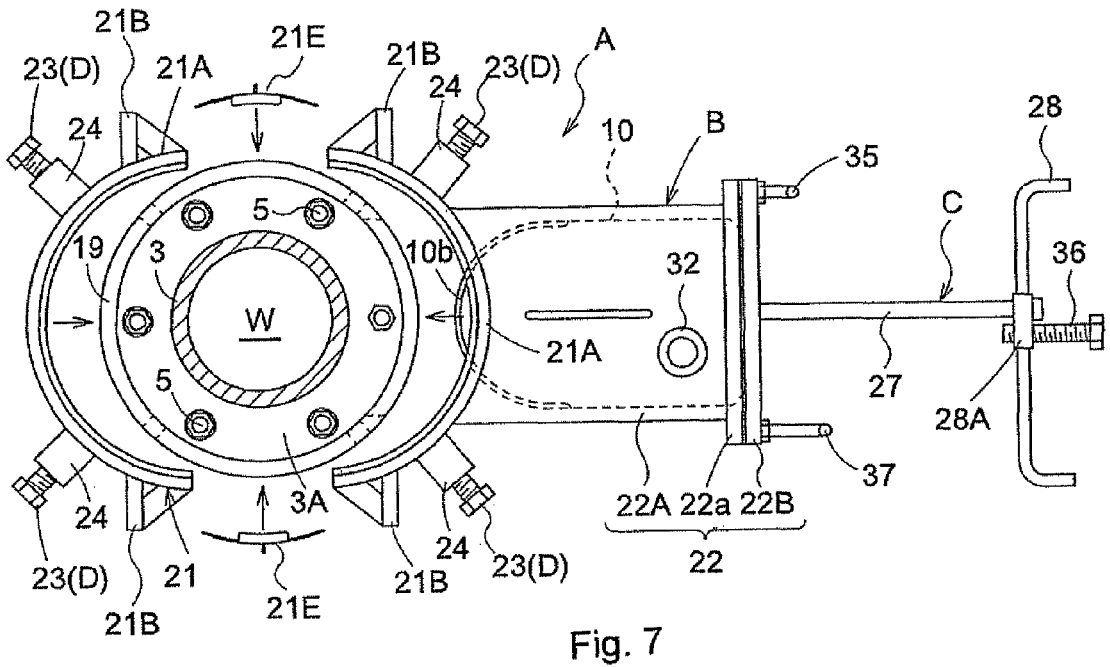
FIG. 7 is plan view in section showing the whole apparatus before the fastener ring of a shutoff operation cover is fixedly connected.
Figure 9:
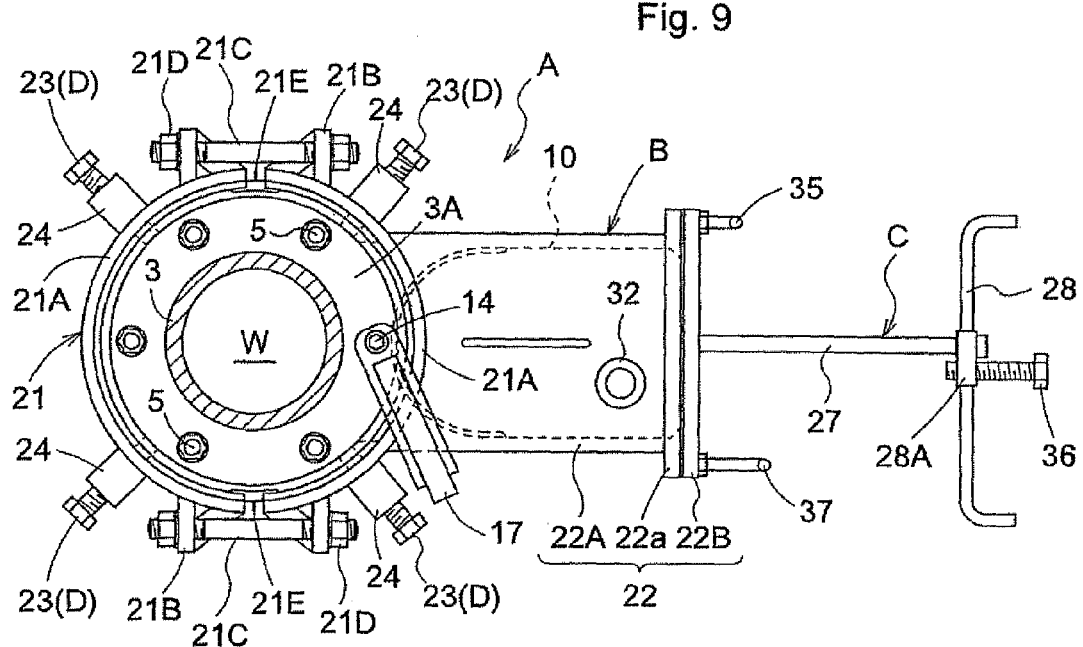
FIG. 9 is a plan view in section showing the whole apparatus when a sealing frame has been attached, FIGS. 10 (a) and (b) are enlarged cross sectional side views of principal portions, illustrating an attaching process of the sealing frame.

As shown in FIG. 7, FIG. 9 and FIG. 11, the gate plate valve 10 is provided in the form of a thin plate which has a width slightly larger than the outside diameters of the branch pipe portion 2 and the joint pipe 3 and whose leading edge is formed semi-circular (having a plate thickness of 3.2 mm in the instant embodiment). Further, the semi-circular leading edge of the leading end portion 10b of the gate plate valve 10 is chamfered to have a V-shaped cross section when its sharp end is located at the plate-thickness wise center position.

Figure 8:
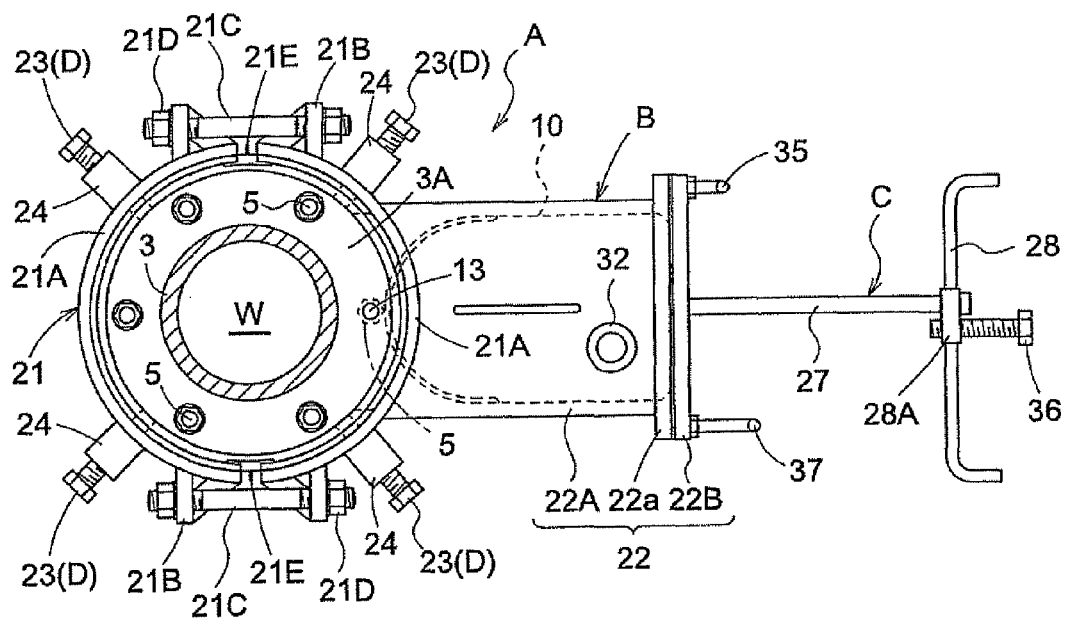
FIG. 8 is plan view in section showing the whole apparatus before the fastener ring of a shutoff operation cover is fixedly connected.

As shown in FIG. 4, FIG. 7 and FIG. 8, the operating means C consists essentially of an operational shaft 27 as an operational member provided continuously in the gate plate valve 10 and an operational handle 28 as an operational member pivotally connected to the leading end portion of the operating shat 27.

As shown in FIG. 7, FIG. 8 and FIG. 11, the valve body accommodating case 22 of the shutoff operation cover B includes an engagement retaining means 35 for engaging and retaining the operational handle 28 of the operating means C at the conduit shutting position. Further, between the shutoff operation cover B and the operational handle 28 of the operating means C, there is provided a forcible opening means 36 for forcibly moving the gate plate valve 10 located at the conduit shutting position toward the conduit opening position side. Also, the shutoff operation cover B includes a popping movement restricting means 37 which comes into contact with the operational handle 28 when this handle 28 of the operating means C located at the conduit shutting position has been moved to an initial opening position offset toward the conduit opening position side, thereby to prevent popping out movement of the handle 28 toward the conduit opening position side.

The engagement retaining means 35 is comprised of an approximately L-shaped retaining member affixed to the lid body 22B of the valve body accommodating case 22 to be engageable and detachable by a pivotal operation of the operational handle 28 located at the conduit shutting position.

Therefore, when the gate plate valve 10 has been switched over to the conduit shutting position through the gap S between the two joining flange portions 2A, 3A formed in association with a loosening operation of the fasteners 5, if the operational handle 28 operated to the conduit closing position is rotated clockwise to be engaged with the engagement retaining member 35 provided on the side of the valve accommodating case 22, this can reliably prevent the gate plate valve 10 switched to the conduit shutting position from being moved toward the conduit opening position side, due to the pressure of fluid tending to flow out of the gap S.

The forcible opening means 36 is comprised of a bolt threaded into a threaded hole formed in an attaching base portion 28A of the operational handle 28. In operation, if the bolt is rotated with the leg portion thereof being placed in contact with the lid body 22B of the valve body accommodating case 22, the opposing distance between the attaching base portion 28A and the lid body 22B is spread apart and widened. With this operation, the gate plate valve 10 which is difficult to be moved at the conduit shutting position, can be forcibly moved in a smooth manner toward the conduit opening position side.

The popping movement restricting means is comprised of an approximately L-shaped retaining member 37 affixed to the lid body 22B of the valve body accommodating case 22. When the gate plate valve 10 is located at the conduit shutting position, if the operational handle 28 is rotated counter-clockwise to be placed into contact with the base end of the engagement retaining member 37, this contact with the end portion of the engagement retaining member 37 can reliably prevent movement of the gate plate valve 10 toward the conduit opening position side.

Accordingly, when the retained condition of the gate plate vale 10 is released with a loosening operation of the fastener 5, the engagement between the retaining member 37 and the operational handle 28 can prevent the gate plate valve 10 located at the conduit opening position from being popped out toward the conduit opening position side, due to the fluid tending to flow out through the gap between the two joining flange portions 2A, 3A. Moreover, as this preventive motion takes place, not in the vicinity of the conduit shutting position, but in the vicinity of the initial opening position offset toward the conduit opening position side, the impact applied to the retaining member 37 can be small, so that the popping movement restricting means can be formed simple as well.

Next, a method of shutting off a conduit in a fluid piping system with using the pipe conduit shutoff apparatus A having the above-described construction will be described.

[1] In the pipe joining construction included in the fluid pining system shown in FIG. 1, let us suppose that there has arisen a need for replacing the repair valve 6 due to a certain reason such as water leak or failure, with maintaining uninterrupted water supply condition of maintaining the clean water within the waterworks pipe 1.

In this case, as shown in FIG. 9 and FIG. 11, it is supposed a case of assembling the pipe conduit shutoff apparatus A for shutting off a pipe conduit W along the branch axis direction Y normal to the pipe axis X of the waterworks pipe 1, between the joining flange portion 2A of the branch pipe portion 2 and the upstream joining flange portion 3A of the joint pipe 3.

First, as shown in FIG. 2 and FIG. 3, some of the plurality of sets of standard type bolts 5A, nuts 5B fastening and joining the joining flange portion 2A of the branch pipe portion 2 and the joining flange portion 3A of the joint pipe 3 are replaced by water-proof type bolts 5A and nuts 5B. This replacement operation will be carried out for each one set or each two sets. The water-proof bolts 5A and nuts 5B have lengths allowing interposition of sealing washers 12 between the head 5a of the bolt 5A and the joining flange portion 2A of the branch pipe portion 2 and between the nut 513 and the upstream joining flange portion 3A of the joint pipe 3, respectively.

[2] As shown in FIGS. 4 through 6, over and across the outer peripheral face of the joining flange portion 2A of the branch pipe portion 2 and the outer peripheral face of the joining flange portion 3A of the joint pipe 3, the annular elastic seal member 19 is attached. In this, a positioning marking will be provided in the upper face of the joining flange portion 3A and the annular elastic seal member 19, so that the opening 19c and the through hole 19d formed in the annular elastic seal member 19 may be set at the predetermined attaching positions.

[3] As shown in FIG. 4, FIG. 7 and FIG. 8, to the outer peripheral face of the annular elastic seal member 19, the two retaining pieces 21d of the pair of backing plates 21E are engaged and fitted from the radially outer side. Next, the pair of fastener split rings 21A are engaged and fitted from the radially outer side. In this case, the backing plate 21E is superposed between the mutually adjacent end portions of the pair of fastener split rings 21A.

In the above, the rear end portion 10a of the gate plate valve 10 is still in contact with the inner face of the hd body 22B, and the leading end portion 10b of the gate plate valve 10 projects farther to the outside of the case than the contacting portion of the annular elastic seal member 19 contacting the outer peripheries of the two joining flange portions 2A, 3A. As shown in FIG. 11, the leading end portion 10b of the gate plate valve 10 protrudes into the annular gap 26 formed on the outer peripheral side of the opposing faces of the two joining flange portions 2A, 3A.

Moreover, as shown in FIG. 11, when the leading end portion 10b slightly advances into the annular gap 26 between the opposing faces of the two joining flange portions 2A, 3A, the leading end portion 10b comes into contact with the outer peripheral portion of the downstream sealing face of the sheet packing 4 protruding into the annular gap 26.

Next, as shown in FIG. 7 and FIG. 8, of the joining pieces 21B of the two fastener split rings 21A, the joining pieces 21B opposed to each other along the insertion/drawing direction of the gate plate valve 10 are drawn toward each other and fixed together by the bolts 21C and the nuts 21D. With this operation, the two first sealing portions 19a are sealed and pressed with a predetermined contact pressure against the outer peripheral faces of the two joining flange portions 2A, 3A. At the same time, the second sealing portion 19b is sealed and pressed with a predetermined contact pressure within the annular gap 26 between the opposing faces of the two joining flange portions 2A, 3A. As a result, even if the first fastener 5 is loosened and there occurs a relative separating movement occurs between the branch pipe 2 and the joint pipe 3 due to water pressure, these sealing (water tight) pressed contacts prevent fluid from flowing freely out of the system.

Incidentally, the mutually drawing amount between the joining pieces 21B will be preset at such an amount that allows the branch pipe portion 2 and the joint pipe 3 to move away from each other in association with the loosening operation of the first fastener 5.

[4] As shown in FIG. 9, FIG. 10 and FIG. 11, one set of bolt 5A and nut 5B present in the movement path of the gate plate valve 10 are removed. Next, the sealing frame 17 is fitted externally from the radially outer side and the position of the seal member 15 of the sealing frame 17 is aligned with the bolt insertion holes 13 of the two joining flange portions 2A, 3A after the removal. By rotating the pressing means 14 of the sealing frame 17, the seal member 15 is pressed against the opening edges of the bolt insertion holes 13 of the two joining flange portions 2A, 3A after the removal. With this, the bolt insertion holes 13 of the two joining flange portions 2A, 3A are sealed by the seal member 15.

[5] As shown in FIG. 12, the bolt 5A and nut 5B of the first fastener 5 and the threaded shaft constituting the pressing means 14 of the sealing frame 17 are loosened by an amount corresponding to the predetermined gap S. With this, as shown in FIG. 12 (b), there is created the gap S between the joining faces of the two joining flange portions 2A, 3A. This gap S is sized so as to allow introduction of the thin-plate like valve plate 8A of the gate plate valve 8 with some play.

In the above, by rotating the head of each separation bolt 23 with a tool such as a wrench, the separation bolt 23 is threadingly advanced. With this, the tapered face 23a of each separation bolt 23 is moved to the radially inner side facing the annular gap 26 between the adjacent faces of the two joining flange portions 2A, 3A, whereby the two joining flange portions 2A, 3A are forcibly spread apart from each other within the range of the amount of the loosening operation of the first fastener 5.

Figure 13:
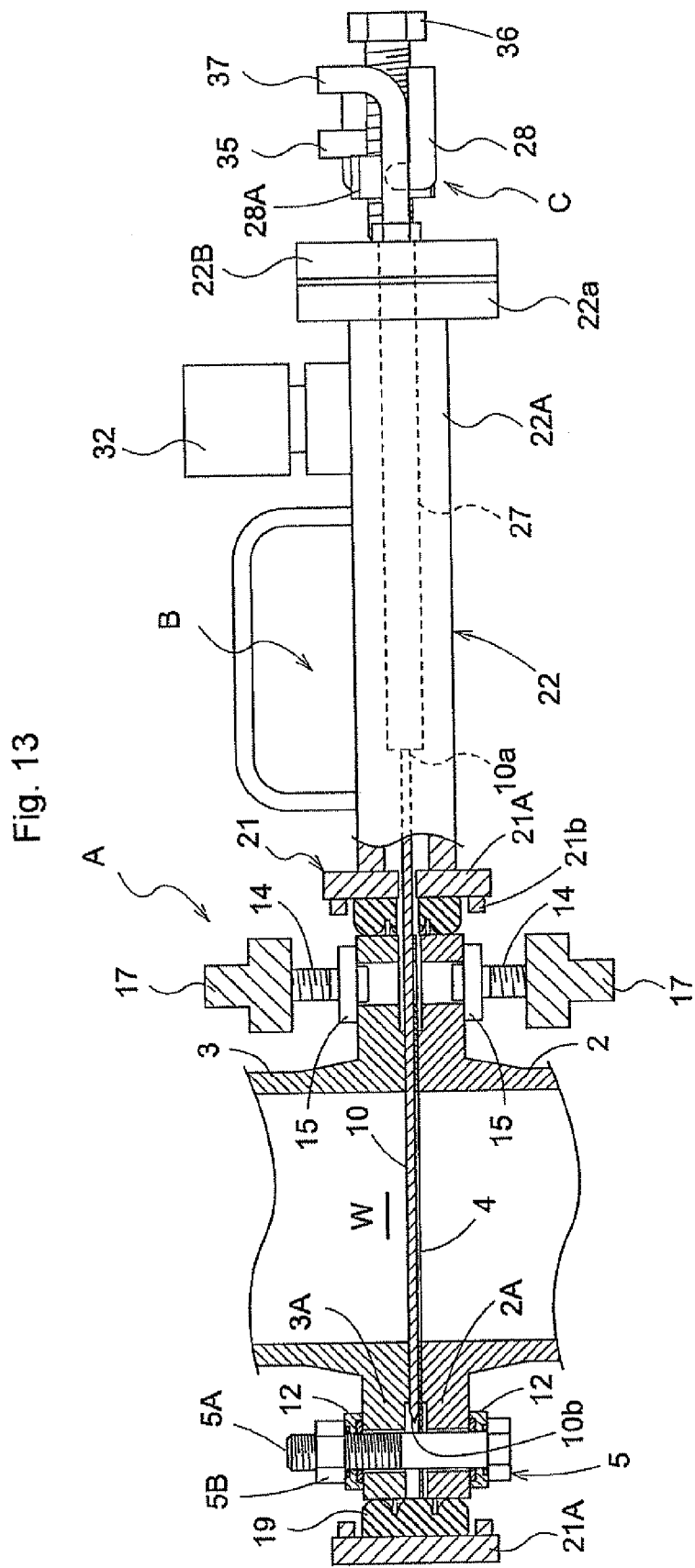
FIG. 13 is a partially cutaway side view showing entirety when a gate plate valve has been switched over to a conduit shutting position.
Figure 14:
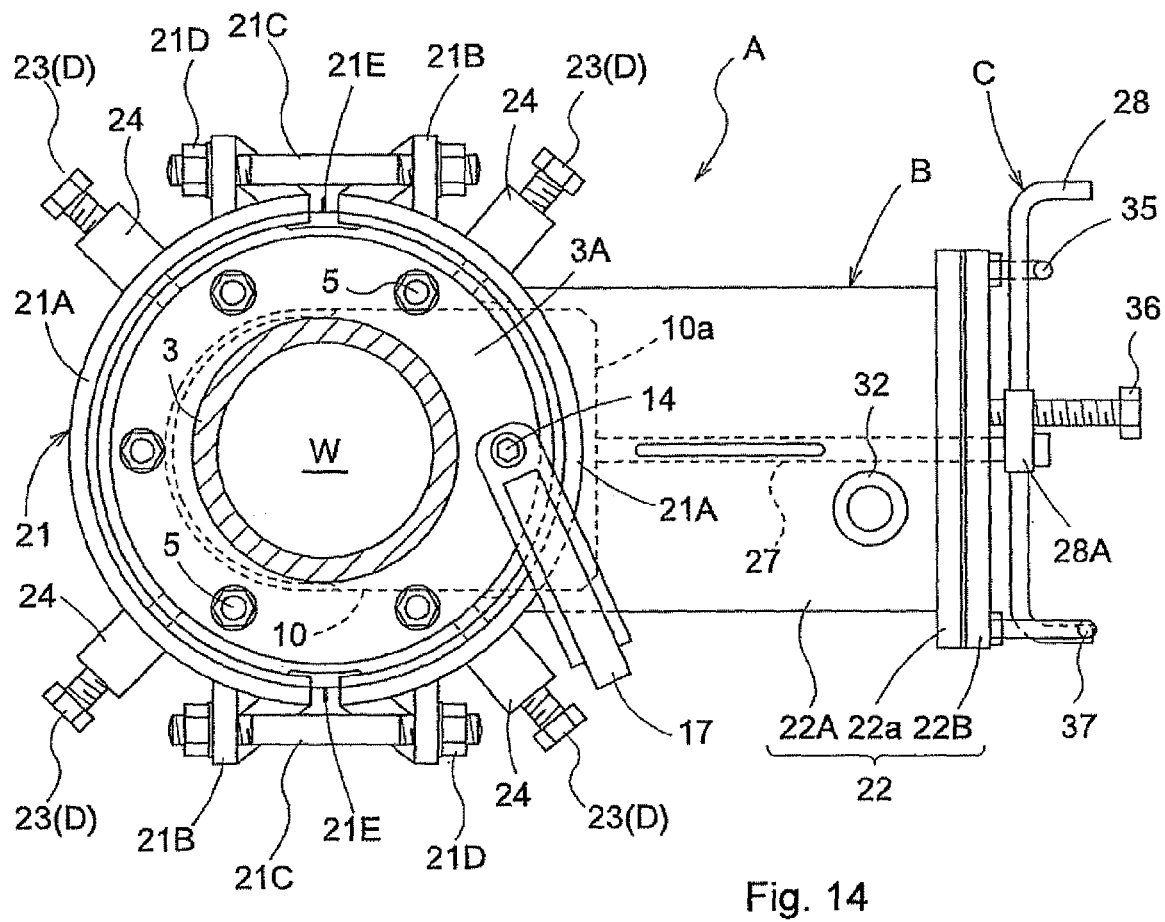
FIG. 14 is a plan view in cross section showing the whole apparatus when the gate plate valve has been switched over to the conduit shutting position.
Figure 15:
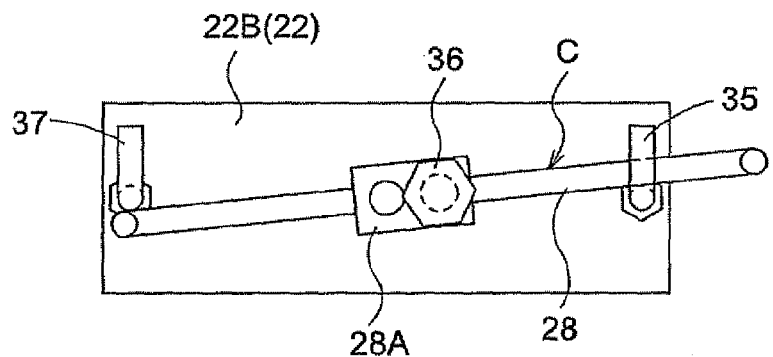
FIG. 15 is an enlarged front view of an operating means.

[6] Next, as shown in FIG. 13 and FIG. 14, by pressing the operational handle 28 of the operating means C, the gate plate valve 10 located at the conduit opening position is switched over to the conduit shutting position. And, as shown in FIG. 15, the operational handle 28 is rotated clockwise at the conduit shutting position, thereby to engage this operational handle 28 with the retaining member 35 provided on the side of the valve body accommodating case 22. With this, it is possible to reliably prevent the gate plate valve 10 switched to the conduit shutting position from being moved inadvertently toward the conduit opening position side, due to fluid flowing out of the gap S.

Thereafter, by fastening the bolt 5A and nut 5B of the first fastener 5 and the threaded shaft constituting the pressing means 14 of the sealing frame 17, the gate plate valve 10 located at the conduit shutting position is clamped and fixed between the two joining flange portions 2A, 3A. With this, the pipe conduit W is shut off between the joining flange portion 2A of the branch pipe portion 2 and the upstream joining flange portion 3A of the joint pipe 3.

Figure 16:
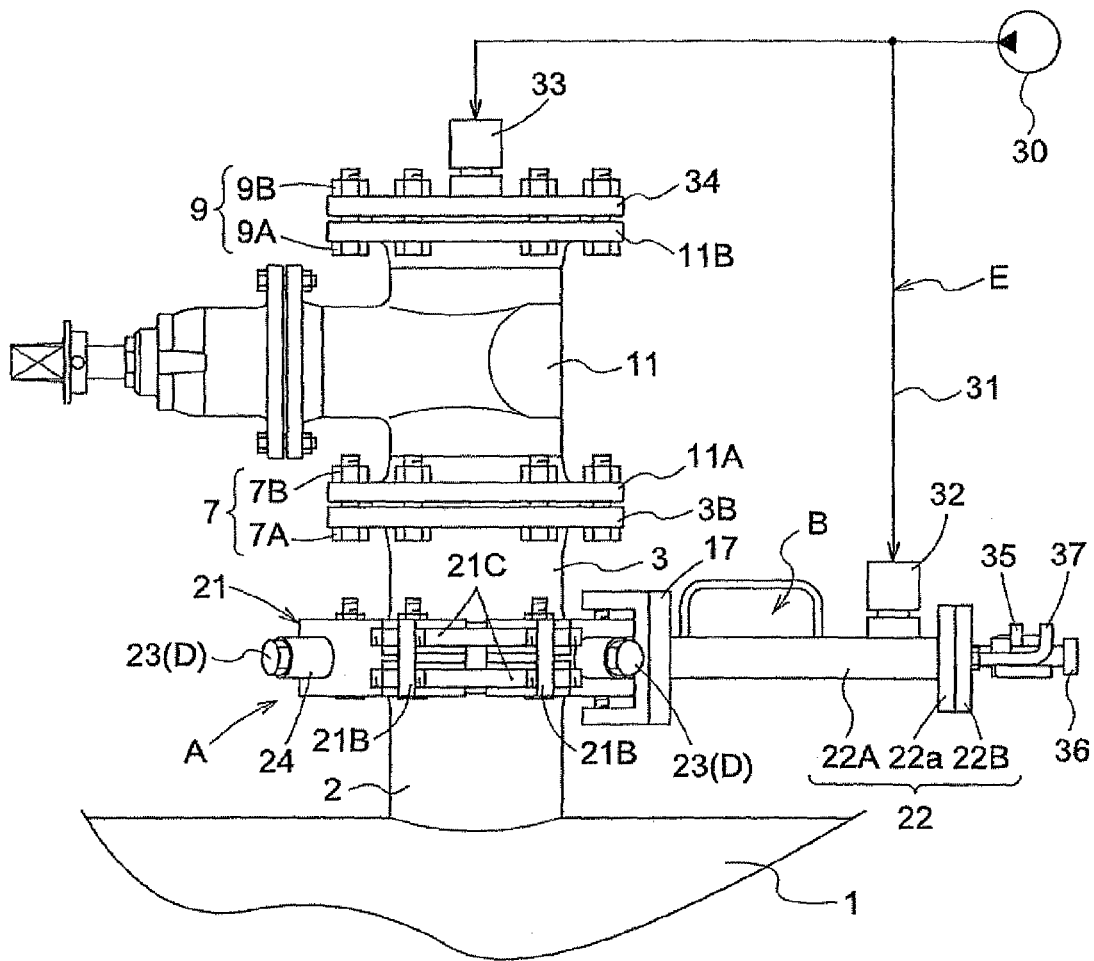
FIG. 16 is a side view when a water feeding hose of a pressurizing device is connected

[7] Then, from the downstream joining flange portion 3B of the joint pipe 3, the repair valve 6 and the air valve 8 are removed. And, as shown in FIG. 16, to the downstream joining flange portion 3B of the joint pipe 3, an upstream joining flange portion 11A of a new gate valve 11 is joined and fastened. In this case, this joining operation is done by a second fastener 7 consisting of a plurality of sets of bolts 7A and nuts 7B, with a sheet packing as an example of seal member, being interposed between joining faces of the downstream joining flange portion 11B and the gate valve 11. Further, to the downstream joining flange portion 11B of this gate valve 11, a lid body 34 is detachably fastened and joined. The lid body 34 includes a connecting tool 33 connectable with the water feeding hose 31 of the pressurizing device E having the hydraulic pump 30. In this case too, this joining operation is done by a third fastener 9 consisting of a plurality of sets of bolts 9A and nuts 9B, with a sheet packing as an example of seal member, being interposed between joining faces of the downstream joining flange portion 11B and the lid body 34.

Next, the water feeding hose 31 of the pressurizing device E is connected to the connecting tool 32 of the valve body accommodating case 22 and the connecting tool 33 of the lid body 34. Then, with pressurized water fed from the hydraulic pump 30, the pressure inside the joint pipe 3 and the gate valve 11 and the pressure inside the valve body accommodating case 22 are rendered equal or substantially equal to the inner pressure of the branch pipe portion 2.

Figure 17:
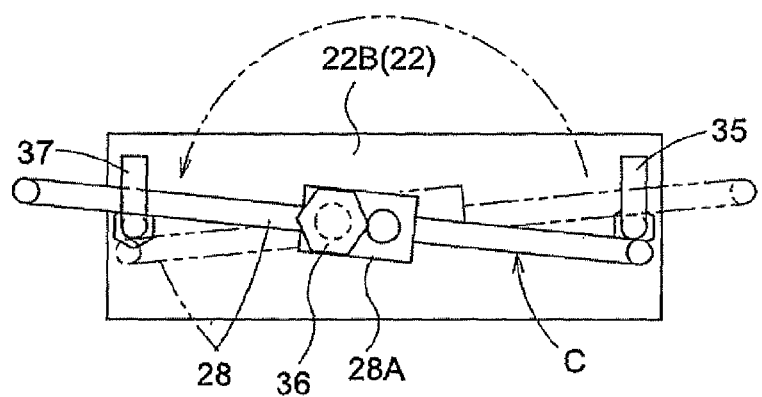
FIG. 17 is an enlarged front view of the operating means, FIGS. 18 (a) and (b) are enlarged front views of principal portions illustrating an operation process of a forcible opening means.
Figure 18:
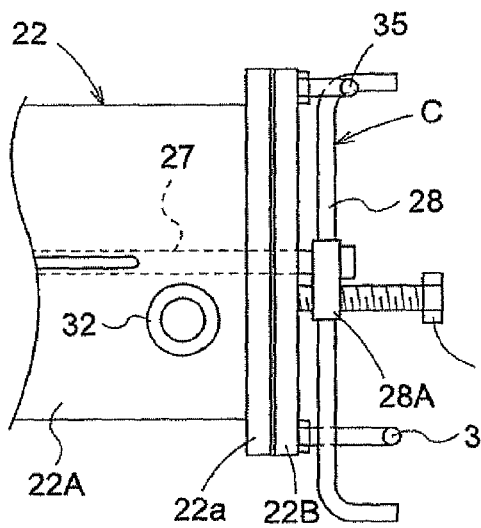
Figure 18:
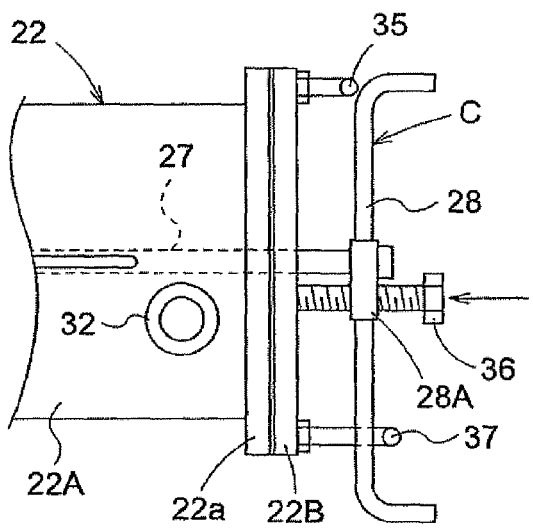

[8] Next, as shown in FIG. 17, by a rotating operation of the operational handle 28 in clockwise direction, the operational handle 28 is pressed onto the retaining member 37. In this condition, the bolt 5A and nut 5B of the first fastener 5 and the threaded shaft constituting the pressing means 14 of the sealing frame 17 are loosened by an amount that corresponds the predetermined gap S, then the operational handle 28 that is in its conduit shutting position is operated in a drawing-out manner to the conduit opening position.

In this situation, since the retaining member 37 and the operational handle 28 are engaged simultaneously in advance, it is possible to reliably prevent the gate plate valve 10 located at the conduit opening position from being popped out toward the conduit opening position side, due to the fluid flowing out through the gap S between the two joining flange portions 2A, 3A.

Further, when it is difficult to operate the operational handle 28 located at the conduit shutting position to the conduit opening position due to the weight of the gate plate valve 10 and/or moving resistance, the operational handle 28 can be forcibly moved by utilizing the forcible opening means 36. That is to say, as in FIG. 18, by rotating the bolt or the like threaded on the attaching base portion 28A of the operational handle 28 and that constitutes the forcible opening means 36, the opposing distance between the attaching base portion 28A of the operational handle 28 and the lid body 22B can be increased, so as to allow smooth forcible movement of the gate plate valve 10 toward the conduit opening position side.

Figure 19:
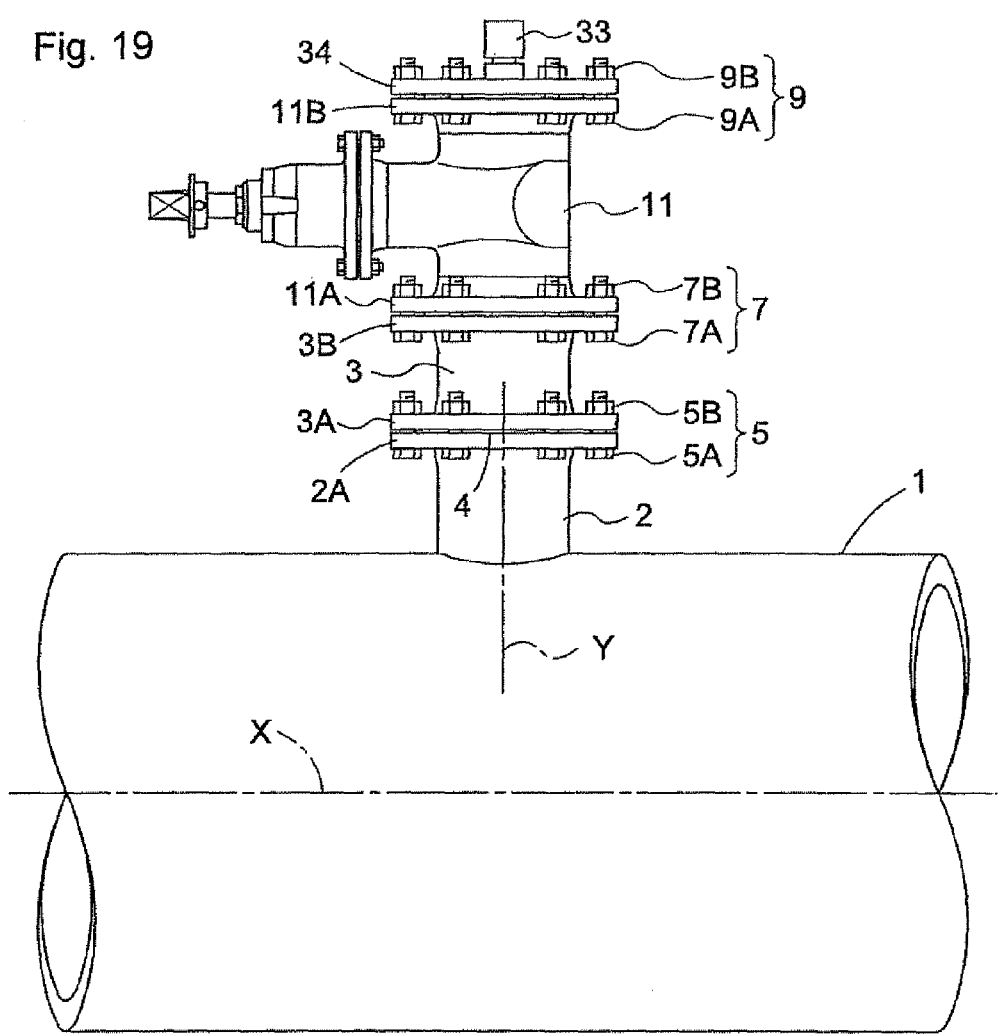
FIG. 19 is a side view when the pipe conduit shutoff apparatus has been dismounted.

[9] Next, by fastening the bolt 5A and nut 5B of the first fastener 5 and the threaded shaft constituting the pressing means 14 of the sealing frame 17, the two joining flange portions 2A, 3A are fixedly joined to each other under a sealed condition. Next, as shown in FIG. 19, the pipe conduit shutoff apparatus A which has been mounted between the joining flange portion 2A of the branch pipe portion 2 and the upstream joining flange portion 3A of the joint pipe 3 is now removed.

Second Embodiment

Figure 20:
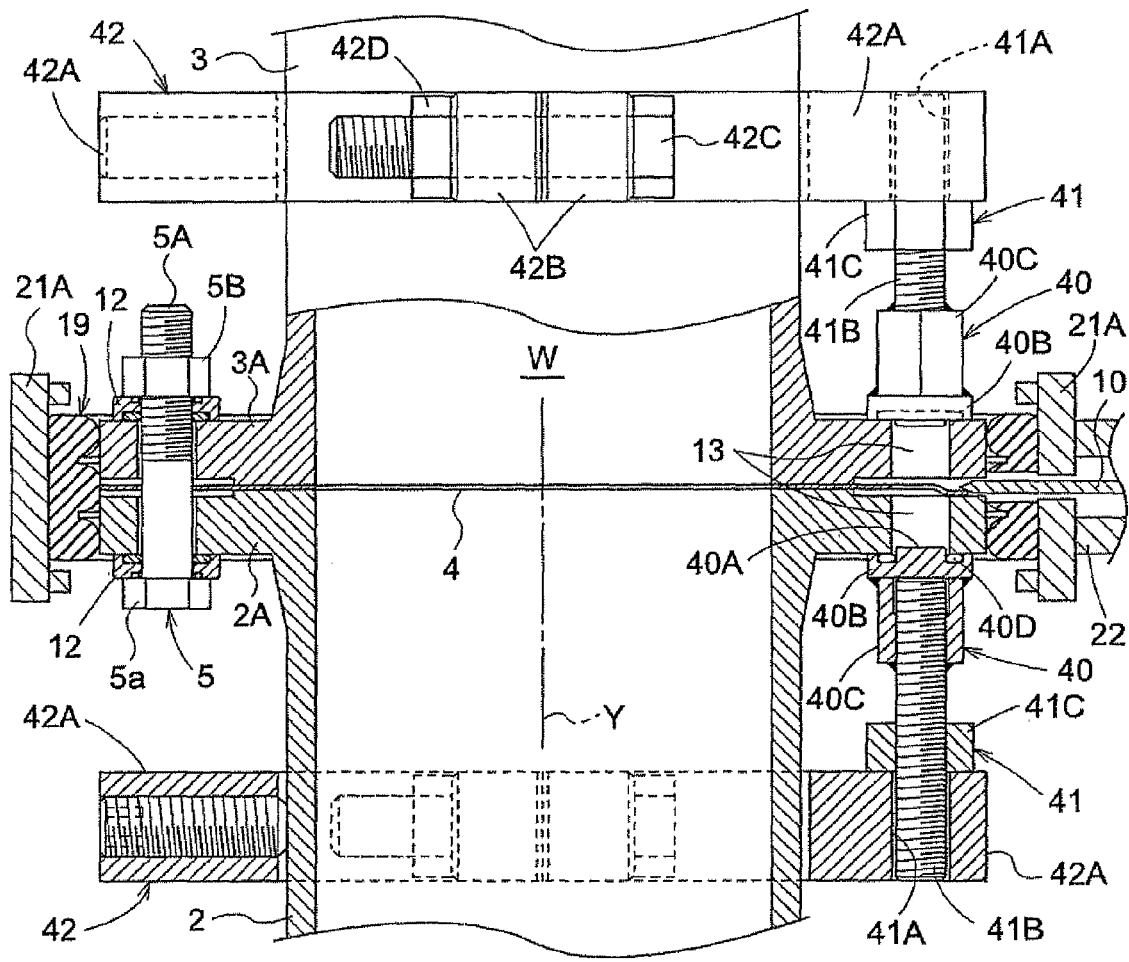
FIG. 20 is a partially cutaway side view showing a second embodiment of the present invention.
Figure 21:
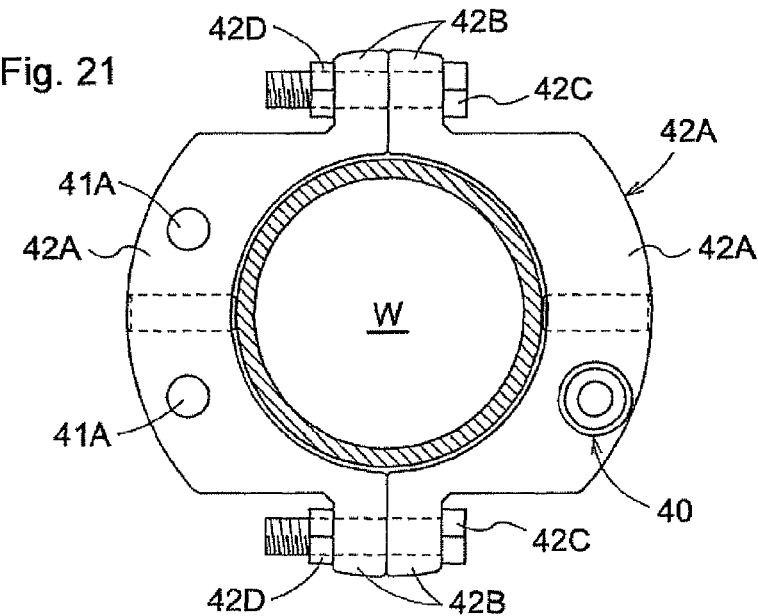
FIG. 21 is a plan view in cross section showing the principal portions of FIG. 20.

Instead of the bolt hole sealing means and the bolt hole sealing process of the first embodiment described above with reference to FIG. 10, it is possible to employ a bolt hole sealing means and process as shown in FIG. 20 and FIG. 21. In this case, there is employed an attaching ring 42 of a split construction.

First, of the plurality of sets of bolts 5A and nuts 5B constituting the fastener 5, the bolt 5A and nut 5B present in the movement path of the gate plate valve 10 are removed from the bolt insertion holes 13 of the two joining flange portions 2A, 3A. Up to this step, the embodiment does not differ from the first embodiment. Next, the split attachment rings 42 are attached over and fixed to the two pipe portions 2, 3. To the attachment ring 42, there are assembled a seal member 40 for sealing the bolt insertion holes 13 of the two joining flange portions 2A, 3A from their opening side after the removal and a pressing means 41 for pressing and moving the seal member 60 toward the opening side of the bolt insertion holes 13.

The seal member 40 includes a shaft portion 40A engageable into the bolt insertion holes 13, a flange portion 40B for coming into contact with the outer peripheral faces of the opening edges of the bolt insertion holes 13, and a threaded cylinder portion 40C fixed to the rear face of the flange portion 40B. In an annular groove defined in the flange portion 40B, there is attached a seal member 40D for sealing (water tightening) relative to the outer face of the joining flange portion 2A or 3A.

The pressing means 41 consists of a threaded shaft 41B affixed to the threaded cylinder portion 40C of the seal member 40 and an operational nut 41C threaded to the threaded shaft 41B. The threaded shaft 41B is inserted into a through hole 41A formed in the attachment ring 42. When the nut 41C is rotated clockwise by a wrench or the like, the nut 41C is pressed against one face of the attachment ring 42 and the threaded shaft 41B is drawn out of the through hole 41A, so that the flange portion 40B is placed in sealed contact with the outer face of the opening edges of the bolt insertion holes 13.

As shown in FIG. 21, the attachment ring 42 consists of a pair of semicircular split rings 42A, and bolts 42C and nuts 42D for drawing connecting pieces 42B provided at peripheral opposed ends of each split ring 42A closer to each other and fixing them together. One split ring 42A defines one through hole 41A provided according to the mode of using 6 (six) sets of bolts 5A and nuts 5B. The other split ring 42A defines two through holes 41A provided according to the further mode of using 8 (eight) sets of bolts 5A and nuts 5B.

Incidentally, the rest of the construction is identical to that described above in the first embodiment. Therefore, the same reference numerals are provided and discussion thereof will be omitted herein.

Third Embodiment

Figure 22:
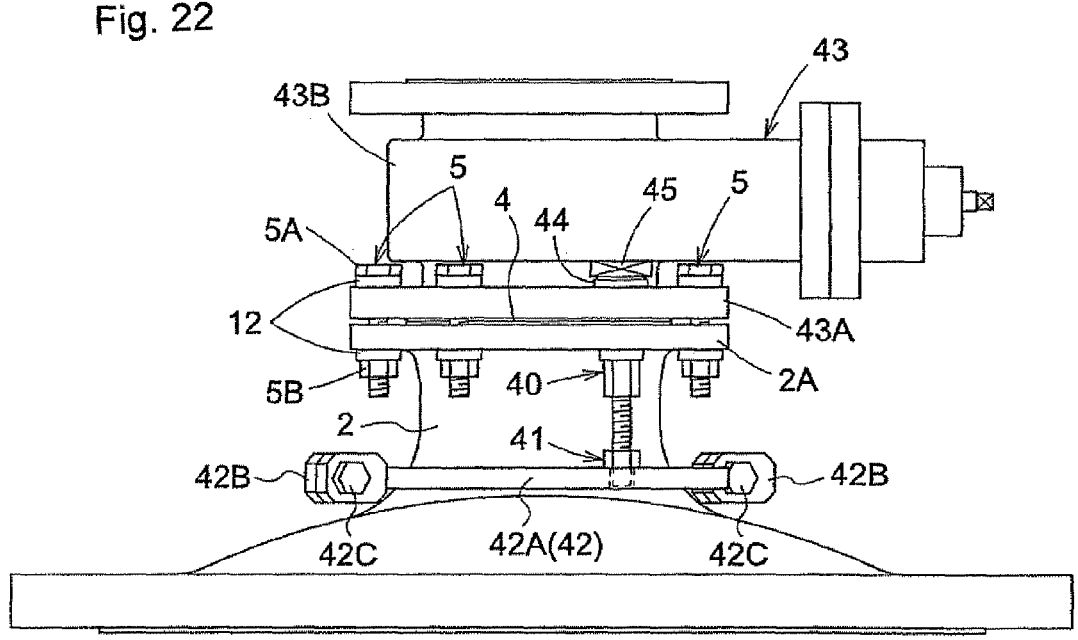
FIG. 22 is a side view showing a third embodiment of the present invention.
Figure 23:
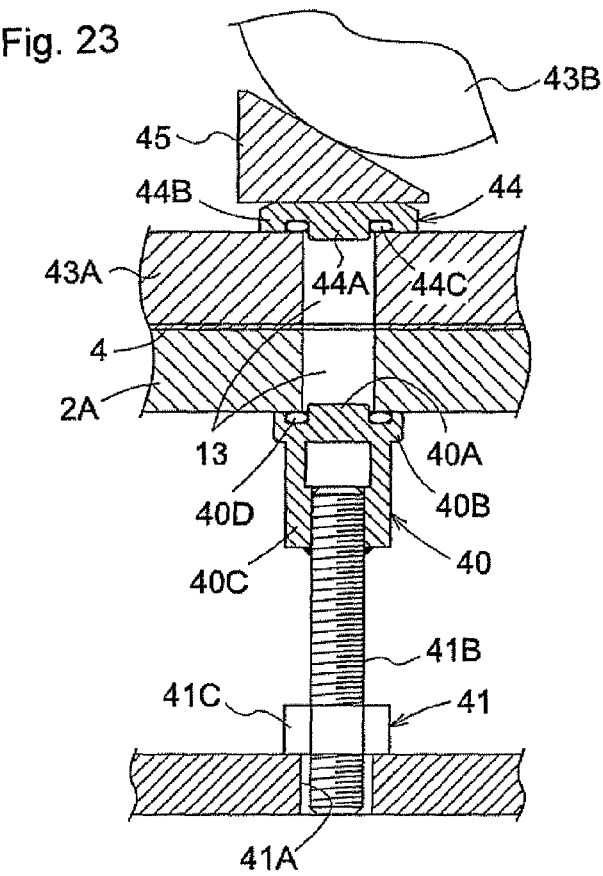
FIG. 23 is an enlarged cross section showing the principal portions of FIG. 22.

The bolt insertion hole 13 present in the movement path of the gate plate valve 10 may be sealed by a bolt hole sealing means shown in FIG. 22 and FIG. 23. This arrangement will be particularly useful in case the distance between the upstream joining flange portion 43A and the valve case portion 43B of the gate valve 43 is small, as shown in FIG. 22.

In this case, as shown in FIG. 23, of the bolt insertion holes 13 defied in the upstream joining flange portion 43A of the gate valve 43, the bolt hole sealing means seals an upper opening of the bolt insertion hole 13 present in the movement path of the gate plate valve 10. This bolt hole sealing means consists of a seal member 44 for sealing bolt insertion holes 13 of the two joining flange portions 2A, 3A after the removal from their opening sides thereof, and a pressing means 45 for pressing and moving the seal member 44 toward the opening sides of the bolt insertion holes 13.

The seal member 44 includes a shaft portion 44A engageable into the bolt insertion hole 13, and a flange portion 44B coming into contact with the outer face of the opening peripheral edge of the bolt insertion hole 13. In an annular groove defined in the flange portion 44B, there is attached a seal member 44C for sealing (water tightening) relative to the outer face of the upstream joining flange portion 43A. The pressing means 45 is comprised of a wedge member to be struck into between the flange portion 44B of the seal member 44 fitted to the bolt insertion hole 13 and the valve case portion 43B of the gate valve 43.

Incidentally, as the bolt hole sealing means for sealing the lower opening of the bolt insertion hole 13 present in the movement path of the gate plate valve 10, among the bolt insertion holes 13 defined in the joining flange portion 2A of the branch pipe portion 2, there is employed the bolt hole sealing means described in the foregoing second embodiment.

Fourth Embodiment

In place of the gate plate valve 10 having the total length described in the first embodiment, it is possible to employ a gate plate valve 10 whose total length is shorter than the distance from the inner face of the lid body 22B forming the bottom of the valve body accommodating case 22 and the inner peripheral face of the annular elastic seal member 19. That is to say, in case the total length of the gate plate valve 10 is shorter than that in the first embodiment like the above, when the attaching operation of the shutoff operation cover B to the two pipe portions 2, 3 is to be started, the leading end portion 11b of the gate plate valve 10 may be disposed at a position more protruding toward the conduit shutting position side than the set advanced position into the annular gap S between the two joining flange portions 2A, 3A.

Figure 24:
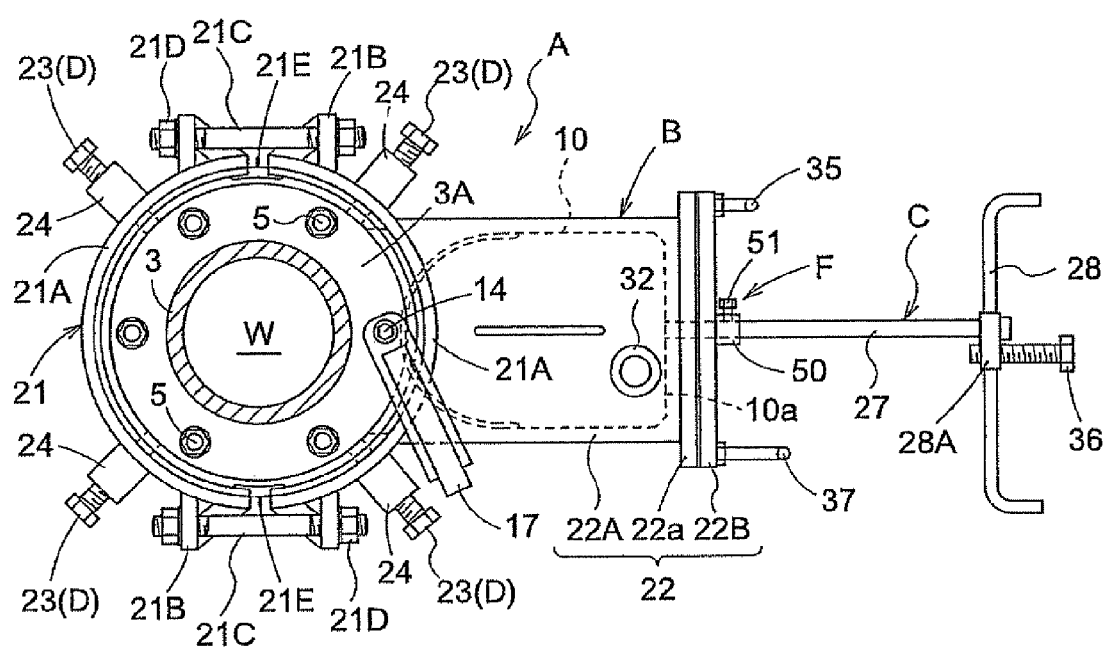
FIG. 24 is a plan view in cross section of the whole apparatus showing a fourth embodiment of the present invention.

Further, in the case of using a gate plate valve 10 having a total length shorter than the distance from the inner face of the lid body 22B forming the bottom of the valve body 22 to the inner peripheral face of the annular elastic seal member 19, when the leading end portion 10b of the gate plate valve 10 is to be set at the retracted position projecting into the annular gap 26 between the two joining flange portions 2A, 3A, as shown in FIG. 24, the leading end portion 10b of the gate plate valve 10 may be fixed at the predetermined retracted position by a setting maintaining means F provided in the shutoff operation cover B, as shown in FIG. 24.

The setting maintaining means F is formed by fixing a cylindrical portion 50 fitted on the operational shaft 27 of the operating means C and providing this cylindrical portion 50 with a fixing bolt 51 for fixing the operational shaft 27 of the operating means C.

According to an alternative construction of the setting maintaining means F, a male thread portion is formed at a part (region corresponding to the annular gap 26) of the operational shaft 27 of the operating means C pivotally and rotatably connected to the gate plate valve 10; and a female thread portion engageable with the male thread portion of the operational shaft 27 is formed in the inner peripheral face of the cylindrical portion 50, so that the leading end portion 10b of the gate plate valve 10 may be retained at a desired position inside the annular gap 26 between the two joining flange portions 2A, 3A.

In short, the setting maintaining means F can be constructed in any manner as long as it can fix or retain in position when the leading end portion 10b of the gate plate valve 10 located at the conduit opening position is at a position where it can enter the annular gap S formed on the outer peripheral side between the opposing faces of the two joining flange portions 2A, 3A, relative to the contacting portion of the shutoff operation cover B contacting the outer peripheries of the two joining flange portions 2A, 3A.

Further, the setting maintaining means F may be provided in the pipe conduit shutoff apparatus A or in at least one pipe portion to which it is attached.

Other Embodiments (1) In the first embodiment, the technique of the present invention is applied to the construction wherein the outer peripheral portion of the sheet packing 4 protrudes into the annular gap 26. However, the technique of the present invention may be applied to a construction wherein the outer peripheral portion of the sheet packing 4 does not protrude into the annular gap 26.

(2) In the first embodiment, there was described a fluid piping system wherein the branch pipe portion 2 is formed integrally at a mid portion of the fluid pipe 1 such as a waterworks pipe. However, the technique of the present invention may be applied to a fluid piping system in which a fluid pipe 1 includes a plurality of split joint bodies detachably fixed and joined to the pipe 1 along the peripheral direction and to one split joint body, there is attached a pipe joint from which a branch pipe portion 2 communicated with a through hole defied in the fluid pipe 1, and an opening/closing valve is attached to the branch pipe portion of the pipe joint.

(3) In the first embodiment, the two pipe portions joined and fastened together by the fastener 5, with the seal member interposed between the joining faces of the two joining flange portions comprise the branch pipe portion 2 as the upstream side pipe portion formed integrally at a mid portion of the fluid pipe 1, and the joint pipe 3 as a downstream pipe portion. Therefore, the two pipe portions comprise pipe members themselves. However, as an alternative construction, the two pipe portions may be, as described above in the third embodiment, a combination of a pipe portion present at a part of the fluid device such as the gate valve 43 and another pipe member. Or, it may also be a combination of pipe portions present at a portion of the fluid device.

(4) In the first embodiment, the operating means C for switching over the gate plate valve 10 under the sealed condition between the conduit shutting position and the conduit opening position is constructed as the manual push-pull type. However, this may be configured to switch over the gate plate valve 10 with a manual rotational operation, using a screw mechanism. Further alternatively, this may be configured to switch over the gate plate valve 10, with using a drive source such as an electric motor, a hydraulic device, etc.

(5) In the first embodiment, the forcible opening means 36 comprises a bolt. Instead, this may comprise other screw mechanism, an electric motor, or the like.

In short, the forcible opening means 36 can have any construction as long as it can forcibly move the gate plate valve 10 located at the conduit shutting position toward the conduit opening position side, by increasing the gap between the shutoff operation cover B and the operational handle 28 of the operating means C.

(6) In the first embodiment, the engagement retaining means 35 comprises an approximately L-shaped retaining member affixed to the lid body 22B of the valve body accommodating case 22. However, this engagement retaining means 35 may have another construction as long as it can engage and retain the operational handle 28 of the operating means C at the conduit shutting position.

(7) In the first embodiment, the popping movement restricting means comprise an approximately L-shaped retaining member 37 affixed to the lid body 22B of the valve body accommodating case 22. However, this popping movement restricting means may have any other construction as long as it can come into contact with the operational handle 28 when the operational handle 28 of the operating means C located at the conduit shutting position has been moved to the initial opening position offset to the conduit opening position, thereby to prevent this handle 28 from being moved toward the conduit opening position side. One such example is a cable-like construction having, at its leading end, a ring to be fitted on the operational handle 28.

(8) In the first embodiment, the elastic seal member 19 of the shutoff operation cover B is formed integrally as an annular member. Instead, this elastic seal member 19 can be divided into a plurality of sections along the peripheral or axial direction.

In short, the shutoff operation cover B can have any other construction as long as it can be detachably attached to the two pipe portions 2, 3 with sealing the outer peripheries of the two joining flange portions 2A, 3A.

(9) In the first embodiment, the gap forming means D comprises a plurality of separation bolts 23 having tapered faces 28a for coming, from the radially outer side, into the gap S between the two joining flange portions 2A, 3A at a plurality of positions of the shutoff operation cover B in the peripheral direction. However, the invention is not limited to this construction. For instance, it may be embodied as a plurality of wedge members urged to enter radially inward.

In short, the gap forming means D can have any other construction as long as it can forcibly spread apart the joining faces of the two joining flange portions 2A, 3A within the range of the loosening operation of the first fastener 5.

(10) The gate plate valve 10 can have any shape as long as it is formed like a thin place which can be inserted to a position for shutting off the pipe conduit W through the gap S formed between the two joining flange portions 2A, 3A formed in association with a loosening operation of the first fastener 5.

What is claimed is:

1. A method of shutting off a conduit in a fluid piping system, the method comprising the steps of attaching a shutoff operation cover to two pipe portions fastened and joined together with a fastener, said shutoff operation cover being capable of sealingly surrounding outer peripheries of respective joining flange portions of the two pipe portions, with allowing a loosening operation of the fastener, said shutoff operation cover including a gate plate valve capable of shutting off conduits of the two pipe portions, the gate plate valve being provided in the form of a thin plate and insertable and withdrawable; and inserting the gate plate valve of the shutoff operation cover from a conduit opening position to a conduit shutting position through a gap formed between the two joining flange portions in association with the loosening operation of the fastener, thereby shutting off the conduit between the two joining flange portions;

wherein when an attaching operation of the shutoff operation cover to the two pipe portions is to be started, a leading end portion of the gate plate valve protrudes within an annular gap formed on an outer peripheral side, which is a conduit shutting position side, of opposing faces of the two joining flange portions, and according as the leading end portion comes into contact with a portion of the pipe portion in the course of its movement into the annular gap during the attaching operation of the shutoff operation cover, the leading end portion of the gate plate valve is retracted toward a conduit opening position side, and when the shutoff operation cover is attached to the two pipe portions, the leading end portion of the gate plate valve at its conduit opening position is positioned into the annular gap relative to a contacting portion of the shutoff operation cover coming into contact with the outer peripheries of the two joining flange portions.

2. The conduit shutoff method according to claim 1, wherein
when the shutoff operation cover is attached to the two pipe portions, the leading end portion of the gate plate valve located at its conduit opening position comes into contact with an outer peripheral portion of a downstream sealing face of a seal member bound between the opposing faces of the two joining flange portions.

3. The conduit shutoff method according to claim 1, wherein the method further comprises the steps of:
removing from among a plurality of sets of bolts/nuts that constitutes the fastener, a bolt and a nut present within a movement path of the gate plate valve from bolt insertion holes of the two joining flange portions;
providing a sealing frame having an approximately angular hook shape, including a seal member for sealing the vacant bolt insertion holes of the two joining flange portions from an opening side and pressing means for pressing and moving the seal member toward the opening side of the bolt insertion holes, and fitting said sealing frame to the two joining flange portions from their outsides; and
sealing the bolt insertion holes of the two joining flange portions from their opening sides by pressing and moving the seal member using said pressing means.

4. The conduit shutoff method according to claim 1, wherein the method further comprises the steps of
removing from among a plurality of sets of bolts/nuts that constitutes the fastener, a bolt and a nut present within a movement path of the gate plate valve from bolt insertion holes of the two joining flange portions;
providing a seal member for sealing the vacant bolt insertion holes of the two joining flange portions from an opening side, and pressing means for pressing and moving the seal member toward the opening side of the bolt insertion holes, and assembling said seal member and said pressing means to the two pipe portions; and
sealing the bolt insertion holes of the two joining flange portions from their opening sides by pressing and moving the seal member using said pressing means.

* * * * *